US012767262B2

(12) United States Patent
Honda et al.

(10) Patent No.: US 12,767,262 B2
(45) **Date of Patent: *Oct. 20, 2026**

(54) BICYCLE CONTROL DEVICE

(71) Applicant: Shimano Inc., Sakai (JP)

(72) Inventors: Masahiro Honda, Sakai (JP); Yasuhiro Tsuchizawa, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,867

(22) Filed: Aug. 28, 2024

(65) Prior Publication Data

US 2024/0417019 A1 Dec. 19, 2024

Related U.S. Application Data

(63) Continuation of application No. 17/004,595, filed on Aug. 27, 2020, now Pat. No. 12,103,625.

(30) Foreign Application Priority Data

Sep. 13, 2019 (JP) ................................ 2019-167306
Jul. 17, 2020 (JP) ................................ 2020-123235

(51) Int. Cl.
*B62J 45/20* (2020.01)
*B62J 45/412* (2020.01)
(Continued)

(52) U.S. Cl.
CPC ............. *B62J 45/20* (2020.02); *B62J 45/412* (2020.02); *B62J 45/413* (2020.02); *B62J 45/414* (2020.02);
(Continued)

(58) Field of Classification Search
CPC ........ B62J 45/20; B62J 45/412; B62J 45/413; B62J 45/414; B62J 50/21; B62J 45/411;
(Continued)

(56) References Cited

U.S. PATENT DOCUMENTS

2014/0039742 A1 2/2014 Tanaka et al.
2018/0162486 A1 * 6/2018 Nishikawa ............... B62M 6/50
2019/0041214 A1 2/2019 Nakamura et al.

FOREIGN PATENT DOCUMENTS

CN 108545142 A 9/2018
EP 2 617 636 A1 7/2013
(Continued)

*Primary Examiner* — Yuen Wong
(74) *Attorney, Agent, or Firm* — Spencer Fane, LLP

(57) ABSTRACT

A control device is used with a human-powered vehicle including a vehicle component and at least first and second detectors. The first detector detects first information of the human-powered vehicle and the second detector detects second information of the human-powered vehicle. The control device includes an electronic controller that controls the vehicle component in accordance with outputs of the first detector and the second detector. The electronic controller controls the vehicle component in accordance with the output of the second detector where the output of the first detector is not in the first state and the output of the second detector is in the second state, and controls the vehicle component in accordance with the output of the first detector where the output of the first detector is in the first state and the output of the second detector is not in the second state.

15 Claims, 16 Drawing Sheets

(51) Int. Cl.

| | |
|---|---|
| ***B62J 45/413*** | (2020.01) |
| ***B62J 45/414*** | (2020.01) |
| ***B62J 50/21*** | (2020.01) |
| ***B62M 1/36*** | (2013.01) |
| ***B62M 6/50*** | (2010.01) |

(52) U.S. Cl.
CPC ................ *B62J 50/21* (2020.02); *B62M 1/36* (2013.01); *B62M 6/50* (2013.01)

(58) Field of Classification Search
CPC ........ B62J 45/4152; B62M 1/36; B62M 6/50; B62M 6/55; B62M 6/45
See application file for complete search history.

(56) References Cited

FOREIGN PATENT DOCUMENTS

| | | | |
|---|---|---|---|
| JP | 2011-33484 | A | 2/2011 |
| JP | 2012-144248 | A | 8/2012 |
| JP | 2016-8044 | A | 1/2016 |
| JP | 2017-156088 | A | 9/2017 |
| TW | 201623088 | A | 7/2016 |

* cited by examiner

BICYCLE CONTROL DEVICE

CROSS-REFERENCE TO RELATED APPLICATIONS

This application is a continuation application of U.S. application Ser. No. 17/004,595, filed on Aug. 27, 2020, and claims priority to U.S. application Ser. No. 17/004,595 under 35 U.S.C. § 120. This application claims priority to Japanese Patent Application No. 2019-167306, filed on Sep. 13, 2019, and Japanese Patent Application No. 2020-123235, filed on Jul. 17, 2020. The entire disclosures of U.S. application Ser. No. 17/004,595 and Japanese Patent Application No. 2019-167306 and 2020-123235 are hereby incorporated herein by reference.

BACKGROUND

Technical Field

The present invention generally relates to a human-powered vehicle control device.

Background Information

Japanese Laid-Open Patent Publication No. 2016-7905 (Patent Document 1) discloses an example of a human-powered vehicle including a detector that is configured to detect information related to the human-powered vehicle.

SUMMARY

One object of the present disclosure is to provide a human-powered vehicle control device that controls a human-powered vehicle component in a preferred manner.

A control device in accordance with a first aspect of the present disclosure is a control device for a human-powered vehicle. The human-powered vehicle includes a vehicle component and a plurality of detectors. The plurality of detectors is configured to detect information related to a vehicle speed of the human-powered vehicle in which the information related to the vehicle speed differs between the plurality of detectors. The plurality of detectors includes at least a first detector. The control device comprises an electronic controller. The electronic controller is configured to control the vehicle component in accordance with an output of the first detector upon determining the output of the first detector is in a first state. The electronic controller is configured to control the vehicle component in accordance with an output of a predetermined detector that differs from the first detector among the plurality of detectors upon determining the output of the first detector is not in the first state.

The control device according to the first aspect allows the vehicle component to be controlled in accordance with the output of the predetermined detector that differs from the first detector among the detectors in a case where the output of the first detector is not in the first state. Thus, the vehicle component of the human-powered vehicle is controlled in a preferred manner.

In accordance with a second aspect of the present disclosure, the control device according to the first aspect is configured so that the human-powered vehicle includes a crank to which human driving force is input. The electronic controller is configured to control the vehicle component in accordance with the output of the first detector upon determining the human driving force input to the crank is greater than a predetermined driving force, and the output of the first detector is in the first state. The electronic controller is configured to control the vehicle component in accordance with the output of the predetermined detector that differs from the first detector among the plurality of detectors upon determining the human driving force input to the crank is greater than the predetermined driving force, and the output of the first detector is not in the first state.

The control device according to the second aspect allows the vehicle component to be controlled in a preferred manner in a case where the human driving force input to the crank is greater than the predetermined driving force, and the output of the first detector is not in the first state.

In accordance with a third aspect of the present disclosure, the control device according to the first or second aspect is configured so that the plurality of detectors further includes a second detector, and the predetermined detector includes the second detector. The electronic controller is configured to control the vehicle component in accordance with an output of the second detector upon determining the output of the first detector is not in the first state and the output of the second detector is in a second state.

The control device according to the third aspect allows the vehicle component to be controlled in accordance with the output of the second detector in a case where the output of the first detector is not in the first state, and the output of the second detector is in the second state.

In accordance with a fourth aspect of the present disclosure, the control device according to the third aspect is configured so that the plurality of detectors further includes a third detector, and the predetermined detector includes the third detector. The electronic controller is configured to control the vehicle component in accordance with an output of the third detector upon determining the output of the first detector is not in the first state and the output of the second detector is not in the second state.

The control device according to the fourth aspect allows the vehicle component to be controlled in accordance with the output of the third detector in a case where the output of the first detector is not in the first state and the output of the second detector is not in the second state.

In accordance with a fifth aspect of the present disclosure, the control device according to the third aspect is configured so that the plurality of detectors further includes a third detector and a fourth detector, and the predetermined detector includes the third detector and the fourth detector. The electronic controller is configured to control the vehicle component in accordance with an output of the third detector upon determining the output of the first detector is not in the first state, the output of the second detector is not in the second state, and the third detector is in a third state. The electronic controller is configured to control the vehicle component in accordance with an output of the fourth detector upon determining the output of the first detector is not in the first state, the output of the second detector is not in the second state, and the third detector is not in the third state.

The control device according to the fifth aspect allows the vehicle component to be controlled in accordance with the output of the third detector in a case where the output of the first detector is not in the first state, the output of the second detector is not in the second state, and the output of the third detector is in the third state. The control device according to the fifth aspect allows the vehicle component to be controlled in accordance with the output of the fourth detector in a case where the output of the first detector is not in the first state, the output of the second detector is not in the second state, and the output of the third detector is not in the third state.

In accordance with a sixth aspect of the present disclosure, the control device according to any one of the third to fifth aspects is configured so that the electronic controller is configured to control the vehicle component in accordance with the output of at least one of the first detector and the second detector upon determining the output of the first detector is in the first state and the output of the second detector is in the second state. The electronic controller is configured to control the vehicle component in accordance with the output of the second detector irrelevant of the output of the first detector upon determining the output of the first detector is not in the first state and the output of the second detector is in the second state. The electronic controller is configured to control the vehicle component in accordance with the output of the first detector irrelevant of the output of the second detector upon determining the output of the first detector is in the first state and the output of the second detector is not in the second state.

The control device according to the sixth aspect allows the vehicle component to be controlled in accordance with the output of the second detector irrelevant of the output of the first detector in a case where the output of the first detector is not in the first state and the output of the second detector is in the second state. The control device according to the sixth aspect allows the vehicle component to be controlled in accordance with the output of the first detector irrelevant of the output of the second detector in a case where the output of the first detector is in the first state and the output of the second detector is not in the second state.

A control device according to a seventh aspect is a control device for a human-powered vehicle. The human-powered vehicle includes a vehicle component and a plurality of detectors. The plurality of detectors includes a first detector and a second detector. The first detector is configured to detect first information related to the human-powered vehicle. The second detector is configured to detect second information related to the human-powered vehicle. The first information is correlated with the second information. The control device comprises an electronic controller. The electronic controller is configured to control the vehicle component in accordance with at least one of an output of the first detector and an output of the second detector upon determining the output of the first detector is in a first state and the output of the second detector is in a second state. The electronic controller is configured to control the vehicle component in accordance with the output of the second detector irrelevant of the output of the first detector upon determining the output of the first detector is not in the first state and the output of the second detector is in the second state. The electronic controller is configured to control the vehicle component in accordance with the output of the first detector irrelevant of the output of the second detector upon determining the output of the first detector is in the first state and the output of the second detector is not in the second state.

The control device according to the seventh aspect allows the vehicle component to be controlled in accordance with at least one of the output of the first detector and the output of the second detector in a case where the output of the first detector is in the first state and the output of the second detector is in the second state.

The control device according to the seventh aspect allows the vehicle component to be controlled in accordance with the output of the second detector irrelevant of the output of the first detector in a case where the output of the first detector is not in the first state and the output of the second detector is in the second state. The control device according to the seventh aspect allows the vehicle component to be controlled in accordance with the output of the first detector irrelevant of the output of the second detector in a case where the output of the first detector is in the first state and the output of the second detector is not in the second state. Thus, the vehicle component of the human-powered vehicle is controlled in a preferred manner.

In accordance with an eighth aspect of the present disclosure, the control device according to the seventh aspect is configured so that the electronic controller is configured to control the vehicle component in accordance with at least one of a first parameter related to the first information and a second parameter related to the second information.

The control device according to the eighth aspect allows the vehicle component to be controlled in accordance with at least one of the first parameter related to the first information and the second parameter related to the second information.

In accordance with a ninth aspect of the present disclosure, the control device according to the eighth aspect is configured so that the electronic controller is configured to estimate the first parameter in accordance with the second parameter calculated from the second information upon determining the output of the first detector is not in the first state and the output of the second detector is in the second state and control the vehicle component in accordance with the estimated first parameter.

The control device according to the ninth aspect allows the first parameter to be estimated in accordance with the second parameter calculated from the second information in a case where the output of the first parameter is not in the first state and the output of the second parameter is in the second state and control the vehicle component in accordance with the estimated first parameter.

In accordance with a tenth aspect of the present disclosure, the control device according to the eighth or ninth aspect is configured so that the electronic controller is configured to estimate the second parameter in accordance with the first parameter calculated from the first information upon determining the output of the first detector is in the first state and the output of the second detector is not in the second state and control the vehicle component in accordance with the estimated second parameter.

The control device according to the tenth aspect allows the second parameter to be estimated in accordance with the first parameter calculated from the first information in a case where the output of the first information is in the first state and the output of the second detector is not in the second state and control the vehicle component in accordance with the estimated second parameter.

A control device in accordance with an eleventh aspect of the present disclosure is for a human-powered vehicle. The human-powered vehicle includes a vehicle component and a plurality of detectors. The plurality of detectors is configured to detect information related to a vehicle speed of the human-powered vehicle in which the information related to the vehicle speed differs between the detectors. The plurality of detectors includes at least a first detector and a second detector. The control device comprises an electronic controller. The electronic controller is configured to control the vehicle component in accordance with at least one of an output of the first detector and an output of the second detector upon determining the output of the first detector is in a first state and the output of the second detector is in a second state. The electronic controller is configured to control the vehicle component so that the vehicle component is in a predetermined state irrelevant of the output of the second detector upon determining the output of the first detector is not in the first state. The electronic controller is configured to control the vehicle component so that the vehicle component is in the predetermined state irrelevant of the output of the first detector upon determining the output of the second detector is not in the second state.

The control device according to the eleventh aspect controls the vehicle component so that the vehicle component is in the predetermined state irrelevant of the output of the second detector in a case where the output of the first detector is not in the first state. Further, the control device controls the vehicle component so that the vehicle component is in the predetermined state irrelevant of the output of the first detector in a case where the output of the second detector is not in the second state. Thus, the vehicle component of the human-powered vehicle is controlled in a preferred manner.

In accordance a twelfth aspect of the present disclosure, the control device according to the eleventh aspect is configured so that the first detector is configured to detect third information related to the vehicle speed, the second detector is configured to detect fourth information related to the vehicle speed, and the third information is correlated with the fourth information.

The control device according to the twelfth aspect allows the vehicle component to be controlled in accordance with the third information and the fourth information.

In accordance with a thirteenth aspect of the present disclosure, the control device according to the twelfth aspect is configured so that the electronic controller is configured to control the vehicle component in accordance with at least one of the third information and the fourth information upon determining the output of the first detector is in the first state and the output of the second detector is in the second state.

The control device according to the thirteenth aspect allows the vehicle component to be controlled in accordance with at least one of the third information and the fourth information in a case where the output of the first detector is in the first state and the output of the second detector is in the second state.

In accordance with a fourteenth aspect of the present disclosure, the control device according to the twelfth or thirteenth aspect is configured so that the electronic controller is configured to control the vehicle component in accordance with both of the third information and the fourth information upon determining the output of the first detector is in the first state and the output of the second detector is in the second state.

The control device according to the fourteenth aspect allows the vehicle component to be controlled in accordance with both of the third information and the fourth information in a case where the output of the first detector is in the first state and the output of the second detector is in the second state.

A control device in accordance with a fifteenth aspect of the present disclosure is for a human-powered vehicle. The human-powered vehicle includes a vehicle component and a plurality of detectors. The plurality of detectors is configured to detect information related to a vehicle speed of the human-powered vehicle in which the information related to the vehicle speed differs between the detectors. The plurality of detectors includes at least a first detector and a second detector. The control device comprises an electronic controller. The electronic controller is configured to control the vehicle component so that the vehicle component is in a predetermined state upon determining at least one of third information related to the vehicle speed of the human-powered vehicle output from the first detector and fourth information related to the vehicle speed of the human-powered vehicle output from the second detector corresponds to a case where the vehicle speed of the human-powered vehicle is greater than or equal to a predetermined vehicle speed.

The control device according to the fifteenth aspect allows the vehicle component to be controlled so that the vehicle component is in the predetermined vehicle speed in a case where at least one of the third information related to the vehicle speed of the human-powered vehicle output from the first detector and the fourth information related to the vehicle speed of the human-powered vehicle output from the second detector corresponds to the case where the vehicle speed of the human-powered vehicle is greater than or equal to the predetermined vehicle speed. Thus, the vehicle component of the human-powered vehicle is controlled in a preferred manner.

In accordance with a sixteenth aspect of the present disclosure, the control device according to the fifteenth aspect is configured so that the electronic controller is configured to control the vehicle component so that the vehicle component is in the predetermined state upon determining one of the third information and the fourth information corresponds to the case where the vehicle speed of the human-powered vehicle is greater than or equal the predetermined vehicle speed.

The control device according to the sixteenth aspect allows the vehicle component to be controlled so that the vehicle component is in the predetermined vehicle speed in a case where one of the third information and the fourth information corresponds to the case where the vehicle speed of the human-powered vehicle is greater than or equal to the predetermined vehicle speed.

In accordance with a seventeenth aspect of the present disclosure, the control device according to the sixteenth aspect is configured so that the electronic controller is configured to control the vehicle component so that the vehicle component is in the predetermined state upon determining both of the third information and the fourth information correspond to the case where the vehicle speed of the human-powered vehicle is greater than or equal the predetermined vehicle speed.

The control device according to the seventeenth aspect allows the vehicle component to be controlled so that the vehicle component is in the predetermined vehicle speed in a case where both of the third information and the fourth information correspond to the case where the vehicle speed of the human-powered vehicle is greater than or equal to the predetermined vehicle speed.

In accordance with an eighteenth aspect of the present disclosure, the control device according to any one of the eleventh to sixteenth aspects is configured so that the vehicle component includes an electric actuator. In this case, the predetermined state includes a state in which the electric actuator is not actuated.

The control device according to the eighteenth aspect allows the electric actuator to be controlled in a preferred manner.

In accordance with a nineteenth aspect of the present disclosure, the control device according to any one of the third to fourteenth aspects is configured so that a signal output from the second detector includes a second predetermined signal in a case where the output of the second detector is not in the second state.

The control device according to the nineteenth aspect allows the electronic controller to determine whether the output of the second detector is in the second state depending on whether a signal output from the second detector includes the predetermined signal.

In accordance with a twentieth aspect of the present disclosure, the control device according to any one of the first to nineteenth aspects is configured so that the plurality of detectors includes at least one of a vehicle speed sensor, a crank rotation sensor, an acceleration sensor, a position information detection sensor, and a motor rotation sensor. The vehicle speed sensor is configured to detect information corresponding to a rotational speed of a wheel of the human-powered vehicle. The crank rotation sensor is configured to detect information corresponding to a rotational speed of a crank of the human-powered vehicle. The acceleration sensor is configured to detect information corresponding to acceleration of the human-powered vehicle. The position information detection sensor is configured to detect information corresponding to a position of the human-powered vehicle. The motor rotation sensor is configured to detect information corresponding to a rotational speed of a motor applying propulsion force to the human-powered vehicle.

The control device according to the twentieth aspect allows the vehicle component to be controlled in accordance with the output of at least one of the vehicle speed sensor, the crank rotation sensor, the acceleration sensor, the position information detection sensor, and the motor rotation sensor.

In accordance with a twenty-first aspect of the present disclosure, the control device according to the fourth aspect is configured so that the plurality of detectors includes at least one of a vehicle speed sensor, a crank rotation sensor, an acceleration sensor, a position information detection sensor, and a motor rotation sensor. The vehicle speed sensor is configured to detect information corresponding to a rotational speed of a wheel of the human-powered vehicle. The crank rotation sensor is configured to detect information corresponding to a rotational speed of a crank of the human-powered vehicle. The acceleration sensor is configured to detect information corresponding to acceleration of the human-powered vehicle. The position information detection sensor is configured to detect information corresponding to a position of the human-powered vehicle. The motor rotation sensor is configured to detect information corresponding to a rotational speed of a motor applying propulsion force to the human-powered vehicle. The first detector includes the vehicle speed sensor.

The control device according to the twenty-first aspect allows the vehicle component to be controlled in a preferred manner in accordance with the output of at least one of the vehicle speed sensor, the crank rotation sensor, the acceleration sensor, the position information detection sensor, and the motor rotation sensor. In a case where the vehicle speed sensor is in the first state, the vehicle component can be controlled in accordance with the output of the vehicle speed sensor.

In accordance with a twenty-second aspect of the present disclosure, the control device according to the twenty-first aspect is configured so that the second detector includes at least one of the crank rotation sensor and the acceleration sensor.

The control device according to the twenty-second aspect allows the vehicle component to be controlled in accordance with the output of at least one of the crank rotation sensor and the acceleration sensor in a case where the vehicle speed sensor is not in the first state.

In accordance with a twenty-third aspect of the present disclosure, the control device according to the twenty-second aspect is configured so that the third detector includes the other one of the crank rotation sensor and the acceleration sensor.

The control device according to the twenty-third aspect allows the vehicle component to be controlled in accordance with the output of the other one of the crank rotation sensor and the acceleration sensor in a case where the vehicle speed sensor is not in the first state and the output of one of the crank rotation sensor and the acceleration sensor is not in the second state.

In accordance with a twenty-fourth aspect of the present disclosure, the control device according to any one of the first to fourteenth and twentieth to twenty-third aspects is configured so that a signal output from the first detector includes a first predetermined signal in a case where the output of the first detector is not in the first state.

The control device according to the twenty-fourth aspect allows the electronic controller to determine whether the output of the first detector is in the first state depending on whether a signal output from the first detector includes the first predetermined signal.

In accordance with a twenty-fifth aspect of the present disclosure, the control device according to the twenty-fourth aspect is configured so that the first signal includes a signal generated in at least one of cases where the first detector is defective, a connection between the first detector and the electronic controller is anomalous, the first detector differs from a predetermined configuration, and the connection between the first detector and the electronic controller differs from a predetermined configuration.

The control device according to the twenty-fifth aspect allows the vehicle component to be controlled in a preferred manner in a case where the first detector is defective, the connection between the first detector and the electronic controller is anomalous, the first detector differs from the predetermined configuration, or the connection between the first detector and the electronic controller differs from the predetermined configuration.

In accordance with a twenty-sixth aspect of the present disclosure, the control device according to any one of the first to fourteenth and twentieth to twenty-fifth aspects is configured so that a signal is not output from the first detector in a case where the output of the first detector is not in the first state.

The control device according to the twenty-sixth aspect allows the controller to determine whether the output of the first detector is in the first state depending on whether the first detector outputs a signal.

In accordance with a twenty-seventh aspect of the present disclosure, the control device according to any one of the first to fourteenth and twentieth to twenty-sixth aspects is configured so that the electronic controller issues predetermined notification information from a notification unit in a case where the output of the first detector is not in the first state.

The control device according to the twenty-seventh aspect allows a user to recognize a case where the output of the first detector is not in the first state with the notification unit.

In accordance with a twenty-eighth aspect of the present disclosure, the control device according to any one of the first to twenty-seventh aspects is configured so that the vehicle component includes a motor configured to apply a propulsion force to the human-powered vehicle.

The control device according to the twenty-eighth aspect allows the motor to be controlled in a preferred manner in accordance with the output of the plurality of detectors.

The human-powered vehicle control device of the present disclosure controls a vehicle component of the human-powered vehicle in a preferred manner.

BRIEF DESCRIPTION OF THE DRAWINGS

Referring now to the attached drawings which form a part of this original disclosure.

DETAILED DESCRIPTION OF EMBODIMENTS

Figure 1:
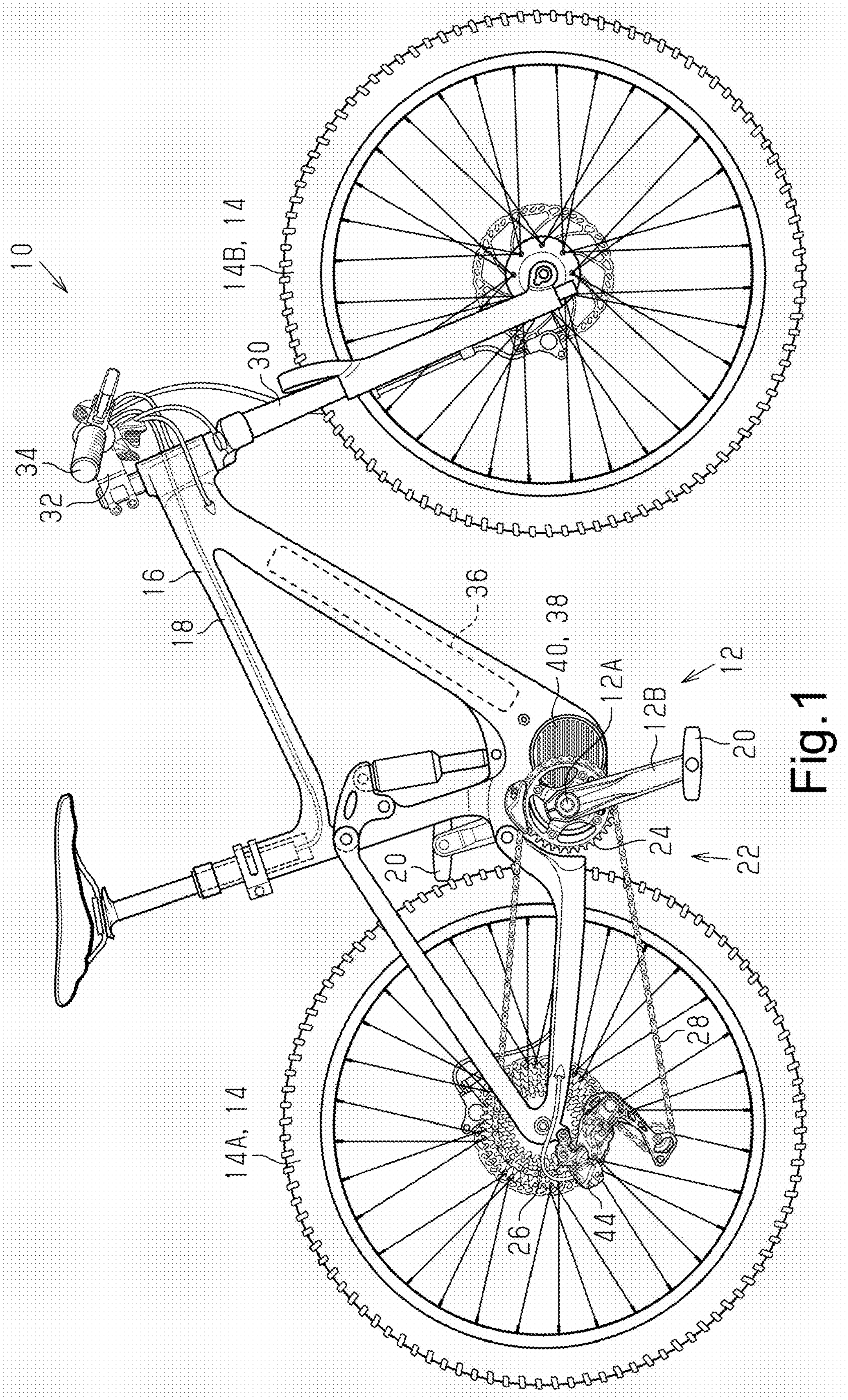
FIG. 1 is a side elevational view of a human-powered vehicle (e.g., a bicycle) including a human-powered vehicle control device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A control device 70 for a human-powered vehicle in accordance with a first embodiment will now be described with reference to FIGS. 1 to 4. A human-powered vehicle 10 is a vehicle that can be driven by at least human driving force H. There is no limit to the number of wheels of the human-powered vehicle 10. For example, the human-powered vehicle 10 can be a unicycle or a vehicle having three or more wheels. Examples of the human-powered vehicle 10 include various types of bicycles such as a mountain bike, a road bike, a city bike, a cargo bike, and a recumbent bicycle, as well as an electric bicycle (E-bike). The electric bicycle includes an electric assist bicycle that assists propulsion of the vehicle with an electric motor. In the embodiments described hereafter, the human-powered vehicle 10 will be referred to as a bicycle.

The human-powered vehicle 10 includes a crank 12 to which human driving force H is input. The human-powered vehicle 10 further includes wheels 14 and a vehicle body 16. The wheels 14 include a rear wheel 14A and a front wheel 14B. The vehicle body 16 includes a frame 18. The crank 12 includes a crank axle 12A and two crank arms 12B. The crank axle 12A is rotatably supported by the frame 18. The two crank arms 12B are provided on axial ends of the crank axle 12A. Two pedals 20 are connected to the two crank arms 12B, respectively. The rear wheel 14A is driven by the rotation of the crank 12. The rear wheel 14A is supported by the frame 18. The crank 12 is connected to the rear wheel 14A by a drive mechanism 22. The drive mechanism 22 includes a first rotational body 24 connected to the crank axle 12A. The crank axle 12A and the first rotational body 24 can be coupled to rotate integrally with each other. Alternatively, the crank axle 12A and the first rotational body 24 can be coupled by a first one-way clutch. The one-way clutch is configured to rotate the first rotational body 24 in a case where the crank 12 is rotated forward, and is configured to allow relative rotation of the crank 12 and the first rotational body 24 in a case where the crank 12 is rotated rearward. The first rotational body 24 includes a sprocket, a pulley, or a bevel gear. The drive mechanism 22 further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is connected to the rear wheel 14A. The second rotational body 26 includes a sprocket, a pulley, or a bevel gear. Preferably, a second one-way clutch is provided between the second rotational body 26 and the rear wheel 14A. The second one-way clutch is configured to rotate the rear wheel 14A in a case where the second rotational body 26 is rotated forward and allow relative rotation of the second rotational body 26 and the rear wheel 14A in a case where the second rotational body 26 is rotated rearward.

The front wheel 14B is attached to the frame 18 by a front fork 30. A handlebar 34 is connected to the front fork 30 by a stem 32. In the present embodiment, the rear wheel 14A is connected to the crank 12 by the drive mechanism 22.

Alternatively, at least one of the rear wheel 14A and the front wheel 14B can be connected to the crank 12 by the drive mechanism 22.

The human-powered vehicle 10 further includes a battery 36. The battery 36 includes one or more battery cells. Each battery cell includes a rechargeable battery. The battery 36 supplies electric power to the control device 70. Preferably, the battery 36 is connected to an electronic controller 72 of the control device 70 through wired or wireless connection in a manner allowing for communication. The battery 36 is configured to communicate with the controller 72 through, for example, power line communication (PLC), Controller Area Network (CAN), and Universal Asynchronous Receiver/Transmitter (UART).

The human-powered vehicle 10 further includes a human-powered vehicle component 38. Preferably, the vehicle component 38 includes an electric actuator 39. Preferably, the vehicle component 38 includes a motor 40 configured to apply propulsion force to the human-powered vehicle 10. In a case where the vehicle component 38 includes the motor 40, the electric actuator 39 is the motor 40. The motor 40 includes one or more electric motors. The motor 40 is configured to transmit rotation to at least one of the front wheel 14B and a power transmission path of the human driving force H extending from the pedals 20 to the rear wheel 14A. The power transmission path of the human driving force H extending from the pedals 20 to the rear wheel 14A includes the rear wheel 14A. In the present embodiment, the motor 40 is provided on the frame 18 of the human-powered vehicle 10 and is configured to transmit rotation to the first rotational body 24. The motor 40 and a housing on which the motor 40 is provided define a drive unit. Preferably, a third one-way clutch is provided in the power transmission path between the motor 40 and the crank axle 12A so that the motor 40 is not rotated by the rotational force of the crank 12 in a case where the crank axle 12A is rotated in the direction in which the human-powered vehicle 10 moves forward. In a case where at least one of the rear wheel 14A and the front wheel 14B includes the motor 40, the motor 40 can include a hub motor.

Preferably, the human-powered vehicle 10 further includes a notification unit 42. The notification unit 42 includes a display unit. A display unit includes, for example, a display panel. A display unit includes, for example, at least one of a portable electronic device, a display, a smartphone, a tablet computer, and a cycle computer. The notification unit 42 can include a speaker.

Preferably, the human-powered vehicle 10 further includes a transmission 44 configured to change transmission ratio R of the human-powered vehicle 10. The transmission ratio R of the human-powered vehicle 10 is a ratio of a rotational speed of the driving wheel to a rotational speed N of the crank 12. In the present embodiment, the driving wheel is the rear wheel 14A. The transmission 44 includes, for example, at least one of a front derailleur, a rear derailleur, and an internal transmission device. In a case where the transmission 44 includes an internal transmission device, the internal transmission device is provided on, for example, a hub of the rear wheel 14A. The transmission 44 includes at least one of an electric transmission configured to be actuated by an electric actuator and a mechanical transmission configured to be operated by a Bowden cable.

Figure 2:
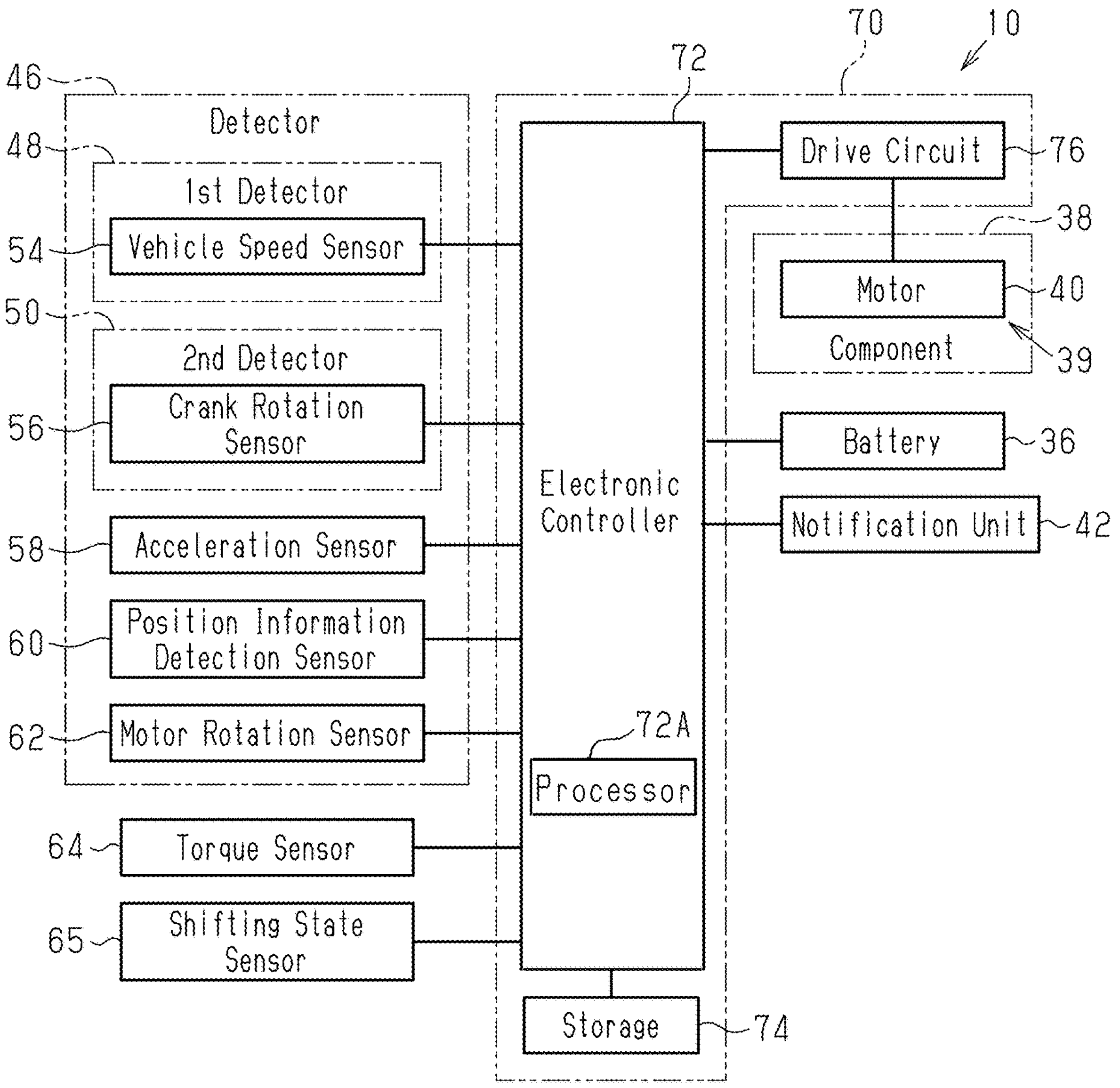
FIG. 2 is a block diagram showing an electric configuration of the human-powered vehicle including the human-powered vehicle control device in accordance with the first embodiment.

The control device 70 includes the electronic controller 72. The term "electronic controller" as used herein refers to hardware that executes a software program, and does not include a human. For the sake of brevity, the electronic controller 72 shall hereinafter be simply referred to as "the controller 72". The controller 72 includes at least one processor 72A that execute predetermined control programs. While only one processor is illustrated in FIG. 2, it will be apparent from this disclosure that several processors can be used. The processors 72A include, for example, a central processing unit (CPU) or a micro-processing unit (MPU). The processors 72A can be located at separate positions. The controller 72 can include one or more microcomputers. Preferably, the control device 70 includes storage 74. The storage 74 stores information used for various types of control programs and control processes. The storage 74 includes any computer storage device or any non-transitory computer-readable medium with the sole exception of a transitory, propagating signal. For example, the storage 74 includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM).

Preferably, the control device 70 further includes a drive circuit 76 of the motor 40. Preferably, the drive circuit 76 and the controller 72 are provided on the housing on which the motor 40 is provided. The drive circuit 76 and the controller 72 can be provided on, for example, the same circuit substrate. The drive circuit 76 includes an inverter circuit. The drive circuit 76 controls the electric power supplied from the battery 36 to the motor 40. The drive circuit 76 is connected to the controller 72 through wireless or wired communication. The drive circuit 76 drives the motor 40 in response to a control signal from the controller 72.

The human-powered vehicle 10 further includes a plurality of detectors 46 configured to detect information related to a vehicle speed V of the human-powered vehicle 10 in which the information related to the vehicle speed V differs between the detectors 46. The term "detector" as used herein refers to a hardware device or instrument designed to detect the presence of a particular object or substance and to emit a signal in response. The term "detector" as used herein do not include a human. The battery 36, the vehicle component 38, the detectors 46 and the control device 70 together from a vehicle (e.g., bicycle) control assembly that controls an operating condition of the human-powered vehicle 10. The detectors 46 are connected to the controller 72 via a wireless communication device or an electric cable. The detectors 46 include at least a first detector 48. Preferably, the detectors 46 further include a second detector 50. The first detector 48 is configured to detect first information related to the vehicle speed V. The first information includes a first parameter P1. The second detector 50 is configured to detect second information related to the vehicle speed V. The second information includes a second parameter P2. Preferably, the first information and the second information are related with each other. The first parameter P1 is correlated with the second parameter P2. The first information can be estimated from the second information.

Preferably, the detectors 46 include at least one of a vehicle speed sensor 54, a crank rotation sensor 56, an acceleration sensor 58, a position information detection sensor 60, and a motor rotation sensor 62. The term "sensor" as used herein refers to a hardware device or instrument designed to detect the presence of a particular object or substance and to emit a signal in response. The term "sensor" as used herein do not include a human. Preferably, the first detector 48 includes the vehicle speed sensor 54.

Preferably, the second detector 50 includes at least one of the crank rotation sensor 56 and the acceleration sensor 58. Preferably, the second detector 50 includes the crank rotation sensor 56. In the present embodiment, the first detector 48 includes the vehicle speed sensor 54, and the second detector 50 includes the crank rotation sensor 56. Any combination of sensors can be included by the first detector 48 and the second detector 50. The first detector 48 can include the crank rotation sensor 56, and the second detector 50 can include the vehicle speed sensor 54. The human-powered vehicle 10 shown in FIG. 2 includes the vehicle speed sensor 54, the crank rotation sensor 56, the acceleration sensor 58, the position information detection sensor 60, and the motor rotation sensor 62. In the present embodiment, at least one of the acceleration sensor 58, the position information detection sensor 60, and the motor rotation sensor 62 can be omitted.

The vehicle speed sensor 54 is configured to detect information corresponding to the rotational speed of the wheel 14 of the human-powered vehicle 10. The vehicle speed sensor 54 is, for example, configured to detect a magnet provided on the wheel 14 of the human-powered vehicle 10. The vehicle speed sensor 54 is, for example, configured to output a predetermined number of detection signals whenever the wheel 14 rotates once. The predetermined number is, for example, one. The vehicle speed sensor 54 outputs a signal corresponding to the rotational speed of the wheel 14. The controller 72 can calculate the vehicle speed V of the human-powered vehicle 10 based on the rotational speed of the wheel 14 and information related to the circumferential length of the wheel 14. The storage 74 stores the information related to the circumferential length of the wheel 14. The vehicle speed sensor 54 includes, for example, a magnetic reed that forms a reed switch or a Hall element. The vehicle speed sensor 54 can be mounted on a chainstay of the frame 18 of the human-powered vehicle 10 and configured to detect a magnet mounted on the rear wheel 14A. Alternatively, the vehicle speed sensor 54 can be provided on the front fork 30 and configured to detect a magnet mounted on the front wheel 14B. In the present embodiment, the vehicle speed sensor 54 is configured so that a reed switch detects a magnet whenever the wheel 14 rotates once. The vehicle speed sensor 54 does not have to be configured to detect a magnet provided on the wheel 14 and can include, for example, an optical sensor. The vehicle speed sensor 54 is connected to the controller 72 via a wireless communication device or an electric cable.

The crank rotation sensor 56 is configured to detect information corresponding to the rotational speed N of the crank 12 of the human-powered vehicle 10. The crank rotation sensor 56 is provided on, for example, the frame 18 of the human-powered vehicle 10 or the drive unit of the human-powered vehicle 10. The crank rotation sensor 56 is configured to include a magnetic sensor that outputs a signal in accordance with the strength of the magnetic field. A ring-shaped magnet of which the magnetic field strength changes in a circumferential direction is provided on the crank axle 12A, a member that is rotated in cooperation with the crank axle 12A, or in the power transmission path extending from the crank axle 12A to the first rotational body 24. A member that is rotated in cooperation with the crank axle 12A includes an output shaft of the motor 40. The crank rotation sensor 56 is configured to output a signal corresponding to the rotational speed N of the crank 12. The magnet can be provided on the member that is rotated integrally with the crank axle 12A in the power transmission path of the human driving force H between the crank axle 12A and the first rotational body 24. For example, in a case where the first one-way clutch is not provided between the crank axle 12A and the first rotational body 24, the magnet can be provided on the first rotational body 24. The crank rotation sensor 56 can include an optical sensor, an acceleration sensor, a gyro sensor, a torque sensor, or the like instead of the magnetic sensor. The crank rotation sensor 56 is connected to the controller 72 via a wireless communication device or an electric cable.

The acceleration sensor 58 is configured to detect information corresponding to acceleration D of the human-powered vehicle 10. Preferably, the acceleration sensor 58 is configured to detect the information corresponding to the acceleration D with respect to forward and rearward directions of the human-powered vehicle 10 in a state in which the human-powered vehicle 10 is held upright on a level plane with the front wheel 14B and the rear wheel 14A in contact with the ground. The acceleration sensor 58 is connected to the controller 72 via a wireless communication device or an electric cable.

The position information detection sensor 60 is configured to detect information corresponding to a position of the human-powered vehicle 10. The position information detection sensor 60 includes, for example, a global positioning system (GPS) receiver. The position information detection sensor 60 is connected to the controller 72 via a wireless communication device or an electric cable. The position information detection sensor 60 can be included in, for example, an electronic device such as a smartphone. In a case where the electronic device is carried by the rider or mounted on the frame, the position information detection sensor 60 can detect the information corresponding to the position of the human-powered vehicle 10.

The motor rotation sensor 62 is configured to detect information corresponding to a rotational speed of the motor 40 that applies propulsion force to the human-powered vehicle 10. The motor rotation sensor 62 is provided on the motor 40 or in the proximity of the motor 40. The motor rotation sensor 62 includes, for example, a resolver or an encoder. In a case where a speed reducer is included between the motor 40 and the transmission path of the human driving force H, the motor rotation sensor 62 can be configured to detect a rotational speed of a rotational body of the speed reducer. The motor rotation sensor 62 is connected to the controller 72 via a wireless communication device or an electric cable.

Preferably, the human-powered vehicle 10 further includes a torque sensor 64. The torque sensor 64 is also a part of the vehicle (e.g., bicycle) control assembly for the human-powered vehicle 10. The torque sensor 64 is configured to output a signal corresponding to the torque applied by the human driving force H to the crank 12. In a case where, for example, the first one-way clutch is provided in the power transmission path, it is preferred that the torque sensor 64 be provided at an upstream side of the first one-way clutch in the power transmission path. The torque sensor 64 includes a torsion sensor, a magnetostrictive sensor, a pressure sensor, and the like. A torsion sensor includes a torsion gauge. The torque sensor 64 is provided in the power transmission path or on a member included in the vicinity of a member included in the power transmission path. The member included in the power transmission path is, for example, the crank axle 12A, a member that transmits the human driving force H between the crank axle 12A and the first rotational body 24, the crank arms 12B, or the pedals 20. The torque sensor 64 is connected to the controller 72 via a wireless communication device or an electric cable.

Preferably, the human-powered vehicle 10 further includes a shifting state sensor 65. The shifting state sensor 65 is also a part of the vehicle (e.g., bicycle) control assembly for the human-powered vehicle 10. The shifting state sensor 65 is configured to output information related to a shifting state of the transmission 44. The shifting state includes, for example, a shift stage. The shifting state sensor 65 can be provided on the transmission 44, a Bowden cable, or a transmission operation device. In a case where the transmission 44 is an electric transmission, the shifting state sensor 65 is configured to, for example, detect an operation of an electric actuator of the electric transmission. The electric actuator of the electric transmission includes, for example, an electric motor and a speed reducer. The shifting state sensor 65 is configured to detect an operation of the electric motor of the electric actuator or the speed reducer. In a case where the transmission 44 is a mechanical transmission, the shifting state sensor 65 is configured to detect, for example, at least one of an operation of a movable portion of the transmission 44, an operation of the Bowden cable, and an operation of the transmission operation device. The shifting state sensor 65 includes, for example, a magnetic sensor, a potentiometer, a rotary encoder, a linear encoder, an optical sensor, or the like. The storage 74 stores the information related to the shifting state output from the shifting state sensor 65 in association with information related to the transmission ratio R of the human-powered vehicle 10. The controller 72 can be configured to obtain information related to the present transmission ratio R of the human-powered vehicle 10 in accordance with the information related to the shifting state output from the shifting state sensor 65 and the information stored in the storage 74.

The controller 72 is configured to control the vehicle component 38 in accordance with outputs of the detectors 46. In a case where the vehicle component 38 is the motor 40, the controller 72 is configured to control the motor 40 in accordance with the outputs of the detectors 46.

The controller 72 is configured to control the motor 40 in accordance with at least one of the vehicle speed V of the human-powered vehicle 10 and the rotational speed N of the crank 12. Preferably, the controller 72 is further configured to control the motor 40 in accordance with the human driving force H. The controller 72 can be configured to control the motor 40 in an assist mode and a walk mode. In the walk mode, the controller 72 is configured to drive the motor 40 upon determining the human driving force H input to the crank 12 is less than or equal to a predetermined driving force HX. The predetermined driving force HX is, for example, 0 Nm. The walk mode is used, for example, in a case where a user walks the human-powered vehicle 10. In the walk mode, the controller 72 is configured to drive the motor 40 upon determining the human driving force H is less than or equal to the predetermined driving force HX. The predetermined driving force HX is, for example, 0 Nm. In the assist mode, upon determining the human driving force H is greater than the predetermined driving force HX, the controller 72 is further configured to control the motor 40 in accordance with the human driving force H and drive the motor 40. The human driving force H can be expressed in torque HT or power WH. In a case where the human driving force H is expressed in power, the human driving force H can be obtained by multiplying the torque detected by the torque sensor 64 and the rotational speed N of the crank 12 detected by the crank rotation sensor 56.

The controller 72 is configured to, for example, control the motor 40 so that a ratio of assist force M generated by the motor 40 to the human driving force H becomes equal to a predetermined assist ratio X. The predetermined assist ratio X does not have to be constant. For example, the predetermined assist ratio X can be changed in accordance with the human driving force H, the vehicle speed V, or both of the human driving force H and the vehicle speed V. The human driving force H and the assist force M can be expressed in torque or power. In a case where the human driving force H and the assist force M are expressed in torque, the human driving force H will be referred to as human torque TH, and the assist force M will be referred to as assist torque TM. In a case where the human driving force H and the assist force M are expressed in power, the human driving force H will be referred to as power based on human force WH, and the assist force M will be referred to as power based on assist force WM. A torque ratio of the assist torque M to the human torque TH of the human-powered vehicle 10 can also be referred to as an assist ratio AT. A ratio of the power based on assist force WM generated by the motor 40 to the power based on human force WH can also be referred to as an assist ratio AW. The controller 72 is configured to, for example, control the motor 40 in one control state selected from a plurality of control states in which the human driving force H is in correspondence with the assist ratio X in at least partially different manners between the control states. The power based on human force WH is calculated by multiplying the human torque TH and the rotational speed N of the crank axle 12A. In a case where the output of the motor 40 is input to the power path of the human driving force H via the speed reducer, the output of the speed reducer corresponds to the assist force M. In a case where the speed reducer is not provided, the power based on assist force WM is calculated by multiplying output torque of the motor 40 and the rotational speed of the motor 40. In a case where the speed reducer is provided, the power based on assist force WM is calculated by multiplying the output torque of the speed reducer and an output rotational speed of the speed reducer. In a case where the speed reducer is provided, the storage 74 is configured to store information related to a speed reduction ratio of the speed reducer. The controller 72 can calculate the output rotational speed of the speed reducer in accordance with the rotational speed of the motor 40 and the information related to the speed reduction ratio of the speed reducer. The storage 74 stores, for example, information indicating the relationship between a control instruction of the motor 40 and the output torque of the motor 40. The controller 72 can calculate the output torque of the motor 40, for example, in accordance with the information stored in the storage 74 indicating the relationship between a control instruction from the motor 40 and the output torque of the motor 40. The controller 72 can calculate the output torque of the speed reducer in accordance with, for example, the output torque of the motor 40 and the information related to the speed reduction ratio of the speed reducer. The controller 72 is configured to output a control instruction to the drive circuit 76 of the motor 40 in accordance with the human torque TH or the power based on human force WH. The control instruction includes, for example, a torque instruction value. The control states can include a control state in which the motor 40 is not driven.

The controller 72 is configured to control the motor 40 so that the assist force M is less than or equal to an upper limit value MX. In a case where the assist force M is expressed in torque, the controller 72 is configured to control the motor 40 so that the assist torque M is less than or equal to an upper limit value MTX. Preferably, the upper limit value MTX is in a range greater than or equal to 30 Nm and less than or equal to 90 Nm. The upper limit value MTX is, for example, 80 Nm. The upper limit value MTX is, for example, determined by output characteristics of the motor 40. In a case where the assist force M is expressed in power, the controller 72 is configured to control the motor 40 so that the assist power WM is less than or equal to an upper limit value MWX.

The controller 72 is configured to, for example, stop the motor 40 upon determining the vehicle speed V becomes greater than or equal to a predetermined vehicle speed VX. The predetermined vehicle speed VX is, for example, 45 km per hour. The predetermined vehicle speed VX can be less than 45 Km per hour, for example, 25 km per hour.

The controller 72 is configured to, for example, stop the motor in a case where the rotational speed N of the crank 12 is less than a first predetermined rotational speed N1. The first predetermined rotational speed N1 is, for example, 0 rpm. For example, upon determining the rotational speed N of the crank 12 becomes greater than or equal to a second predetermined rotational speed N2, the controller 72 can be configured to stop the motor 40 or control the motor 40 so as to decrease the assist force M.

The controller 72 is configured to control the vehicle component 38 in accordance with an output of the first detector 48 upon determining the output of the first detector 48 is in a first state. The controller 72 is configured to control the vehicle component 38 in accordance with an output of a predetermined detector that differs from the first detector 48 among the detectors 46 upon determining the output of the first detector 48 is not in the first state. In the present embodiment, the predetermined detector includes the second detector 50.

Upon determining the output of the first detector 48 is in the first state, the controller 72 is configured to determine that the output of the first detector 48 input to the controller 72 is normal. Upon determining the output of the first detector 48 is not in the first state, the controller 72 is configured to determine that the output of the first detector 48 input to the controller 72 is not normal.

In a first example, in a case where the output of the first detector 48 is not in the first state, a signal output from the first detector 48 includes a first predetermined signal. The first predetermined signal includes an anomalous output signal of the first detector 48. The anomalous signal is generated, for example, in at least one of cases where the first detector 48 is defective, the connection between the first detector 48 and the controller 72 is anomalous, the first detector 48 differs from a predetermined configuration, and the connection between the first detector 48 and the controller 72 differs from a predetermined configuration.

In a second example, in a case where the output of the first detector 48 is not in the first state, the first detector 48 does not output a signal. A case where the first detector 48 does not output a signal includes at least one of cases where the human-powered vehicle 10 does not include the first detector 48, electric power is not supplied to the first detector 48, and the first detector 48 is not connected to the controller 72. In at least one of the first and second examples, the controller 72 can be configured to determine that the output of the first detector 48 is not in the first state.

Preferably, the controller 72 is configured to control the vehicle component 38 in accordance with at least one of the first parameter P1 related to the first information and the second parameter P2 related to the second information. The controller 72 is configured to control the vehicle component 38 irrelevant of the output of the first detector 48 upon determining the output of the first detector 48 is not in the first state. The controller 72 can be configured to control the vehicle component 38 in accordance with an output of the second detector 50 upon determining the output of the first detector 48 is not in the first state. For example, in a case where the controller 72 is configured to estimate the first parameter P1 in accordance with the second parameter P2 related to the second information, the controller 72 uses the output of the first detector 48 for at least one of a first process that corrects the first parameter P1 in accordance with the output of the first detector 48, a second process that corrects a control instruction value of the vehicle component 38 in accordance with the output of the first detector 48, and a third process that is independent of the series of processes for controlling the vehicle component 38 in accordance with the output of the second detector 50.

In the present embodiment, the first parameter P1 includes the vehicle speed V, and the second parameter P2 includes the rotational speed N of the crank 12. The controller 72 is configured to estimate the vehicle speed V in accordance with the rotational speed N of the crank 12. The controller 72 is configured to estimate the vehicle speed V by multiplying the rotational speed N of the crank 12 by the transmission ratio R of the human-powered vehicle 10 and the circumferential length of the rear wheel 14A. The transmission ratio R of the human-powered vehicle 10 corresponds to a ratio of the rotational speed of the wheel 14 to the rotational speed N of the crank 12 of the human-powered vehicle 10. The storage 74 is configured to store information related to the circumferential length of the rear wheel 14A in advance.

In a case where the second detector 50 includes the acceleration sensor 58, the second parameter P2 includes the acceleration D. The controller 72 is configured to estimate the vehicle speed V by cumulating the acceleration D from the point in time at which the human-powered vehicle 10 started to travel.

In a case where the second detector 50 includes the position information detection sensor 60, the second parameter P2 includes a distance over which the human-powered vehicle 10 traveled. The controller 72 is configured to estimate the vehicle speed V in accordance with GPS information received by a GPS receiver, map information stored in advance in the storage 74, and time. In a case where the second detector 50 includes the position information detection sensor 60, it is preferred that the controller 72 include at least one of a clock and a time measurement circuit.

In a case where the second detector 50 includes the motor rotation sensor 62, the second parameter P2 includes the rotational speed of the motor 40. The controller 72 is configured to estimate the vehicle speed V by multiplying the rotational speed of the motor 40 by a transmission ratio of the motor 40 and the circumferential length of the rear wheel 14A. The transmission ratio of the motor 40 corresponds to a ratio of the rotational speed of the wheel 14 to the rotational speed of the motor 40. In a case where the second detector 50 includes the motor rotation sensor 62, the storage 74 stores the information related to the circumferential length of the rear wheel 14A in advance.

Preferably, the controller 72 is configured to issue predetermined notification information from the notification unit 42 in a case where the output of the first detector 48 is not in the first state. The predetermined notification information is configured to notify the user of an error in the first detector 48. In a case where the notification unit 42 includes a display unit, the predetermined notification information includes, for example, at least one of text and graphics. In a case where the notification unit 42 includes a speaker, the predetermined notification information includes, for example, at least one of voice and warning sounds. In a case where the output of the first detector 48 is not in the first state, the controller 72 can be configured to issue notification from the notification unit 42, for example, continuously or intermittently until the output of the first detector 48 shifts to the first state.

A process for controlling the vehicle component 38 in accordance with the state of the output of the first detector 48 will now be described with reference to FIGS. 3 and 4. In a case where electric power is supplied to the controller 72, the controller 72 starts the process from step S11 of the flowchart shown in FIG. 3. In a case where the process of the flowchart shown in FIGS. 3 and 4 ends, the controller 72 repeats the process from step S11 in predetermined cycles until the supply of electric power stops. The process illustrated in FIGS. 3 and 4 indicates an example in which the vehicle component 38 is the motor 40. For example, the controller 72 is configured to execute an assist process that drives the motor 40 in accordance with the human driving force H in parallel to the process of the flowchart shown in FIGS. 3 and 4. For example, the controller 72 is configured to drive the motor 40 upon determining the human driving force H becomes greater than the predetermined driving force HX and stops the motor 40 upon determining the human driving force H becomes less than or equal to the predetermined driving force HX. The controller 72 gives higher priority to the process of the flowchart shown in FIGS. 3 and 4 than the assist process. If the vehicle component 38 is the motor 40, the controller 72 is configured to drive the motor 40 in accordance with the human driving force H upon determining the output of the first detector 48 is in the first state if the vehicle speed V calculated from the output of the first detector 48 is not greater than or equal to the predetermined vehicle speed VX and the human driving force H is greater than the predetermined driving force HX. If the vehicle component 38 is the motor 40, the controller 72 is configured to drive the motor 40 in accordance with the human driving force H upon determining the output of the first detector 48 is not in the first state if the vehicle speed V estimated from the output of the predetermined detector, which differs from the first detector 48, among the detectors 46 is not greater than or equal to the predetermined vehicle speed VX and the human driving force H is greater than the predetermined driving force HX.

In step S11, the controller 72 determines whether the output of the vehicle speed sensor 54 is in the first state. Upon determining the output of the vehicle speed sensor 54 is in the first state, the controller 72 proceeds to step S12. In step S12, the controller 72 calculates the vehicle speed V in accordance with the output of the vehicle speed sensor 54 and then proceeds to step S13.

In step S13, the controller 72 determines whether the vehicle speed V is greater than or equal to the predetermined vehicle speed VX. Upon determining the vehicle speed V is greater than or equal to the predetermined vehicle speed VX, the controller 72 proceeds to step S14. In step S14, the controller 72 stops the motor 40 and then ends the process. In step S14, the controller 72 stops the motor 40 upon determining the motor 40 is being driven. In step S14, the controller 72 keeps the motor 40 stopped upon determining the motor 40 has been stopped. In step S13, upon determining the vehicle speed V is not greater than or equal to the predetermined vehicle speed VX, the controller 72 ends the process.

In step S11, upon determining the output of the vehicle speed sensor 54 is not in the first state, the controller 72 proceeds to step S15. In step S15, the controller 72 determines whether the crank 12 is rotating in a normal rotation direction. Upon determining the crank 12 is not rotating in the normal rotation direction, the controller 72 ends the process. The normal rotation direction is the same as the forward rotation direction. Upon determining the crank 12 is rotating in the normal rotation direction, the controller 72 proceeds to step S16.

In step S16, the controller 72 determines whether information related to the shifting state has been obtained. In a case where the controller 72 has not obtained information related to the shift stage, the controller 72 proceeds to step S17. For example, in a case where the shifting state sensor 65 is not connected to the controller 72, the controller 72 will not obtain the information related to the shift stage. The determination of whether the shifting state sensor 65 is connected to the controller 72 can be performed using information stored in advance in the storage 74 or based on whether a signal from the shifting state sensor 65 is input to the controller 72.

In step S17, the controller 72 determines whether a rotational amount C of the crank 12 is greater than or equal to a predetermined rotational amount CX. For example, in a case where the rotational amount C from the time point at which the crank 12 started rotating is greater than or equal to a first rotational amount CX1, the controller 72 determines that the rotational amount C of the crank 12 is greater than or equal to the first predetermined rotational amount CX1. In a case where the rotational amount C of the crank 12 is not greater than or equal to the first predetermined rotational amount CX1, the controller 72 ends the process. Upon determining the rotational amount C of the crank 12 is greater than or equal to the first predetermined rotational amount CX1, the controller 72 proceeds to step S18. In step S18, the controller 72 issues a notification of an error in the vehicle speed sensor 54 from the notification unit 42 and then proceeds to step S19. In a case where the first predetermined rotational amount CX1 is expressed in a rotational angle of the crank 12, the first predetermined rotational amount CX is included, for example, in a range of 20 degrees and 720 degrees.

In step S19, the controller 72 estimates the vehicle speed V in accordance with a maximum value of the transmission ratio R of the human-powered vehicle 10 and the rotational speed N of the crank 12 and then proceeds to step S20. The maximum value of the transmission ratio R of the human-powered vehicle 10 is stored in advance in the storage 74. The controller 72 is configured to estimate the vehicle speed V by multiplying the maximum value of the transmission ratio R stored in the storage 74, the rotational speed N of the crank 12 detected by the crank rotation sensor 56, and the circumferential length of the rear wheel 14A.

In step S20, the controller 72 determines whether the vehicle speed V estimated in step S19 is greater than or equal to the predetermined vehicle speed VX. Upon determining the vehicle speed V is greater than or equal to the predetermined vehicle speed VX, the controller 72 proceeds to step S21. In step S21, the controller 72 stops the motor 40 and then ends the process. In step S21, the controller 72 stops the motor 40 upon determining the motor 40 is being driven. In step S21, the controller 72 keeps the motor 40 stopped upon determining the motor 40 has been stopped. In step S20, upon determining the vehicle speed V is not greater than or equal to the predetermined vehicle speed VX, the controller 72 ends the process.

In step S16, in a case where the controller 72 has obtained the information related to the shifting state, the controller 72 proceeds to step S22. In step S22, the controller 72 determines whether the rotational amount C of the crank 12 is greater than or equal to a second predetermined rotational amount CX2. The controller 72 can obtain the present transmission ratio R in accordance with the information related to the shift stage and the information stored in the storage 74. Upon determining the rotational amount C of the crank 12 is not greater than or equal to the second predetermined rotational amount CX2, the controller 72 ends the process. Upon determining the rotational amount C of the crank 12 is greater than or equal to the second predetermined rotational amount CX2, the controller 72 proceeds to step S23. The second predetermined rotational amount CX2 can be the same as the first predetermined rotational amount CX1 or differ from the first predetermined rotational amount CX1. The second predetermined rotational amount CX2 can be, for example, separate values corresponding to different shift stages. In a case where the second predetermined rotational amount CX2 changes in correspondence with the shift stage, the storage 74 stores information related to each shift stage in association with the corresponding second predetermined rotational amount CX2. In this case, it is preferred that the second predetermined rotational amount CX2 corresponding to the shift stage at which the transmission ratio R is maximal be equal to the first predetermined rotational amount CX1. For example, in a case where the controller 72 proceeds from step S22 to step S23 and the human-powered vehicle 10 travels over the same distance in each transmission ratio R, the second predetermined rotational amount CX2 will increase as the corresponding transmission ratio R decreases. In step S23, the controller 72 issues a notification of an error in the vehicle speed sensor 54 from the notification unit 42 and then proceeds to step S24.

In step S24, the controller 72 estimates the vehicle speed V in accordance with the present transmission ratio R and the rotational speed N of the crank 12 and then proceeds to step S25. The controller 72 is configured to estimate the vehicle speed V by multiplying the present transmission ratio R, the rotational speed N of the crank 12 detected by the crank rotation sensor 56, and the circumferential length of the rear wheel 14A.

In step S25, the controller 72 determines whether the vehicle speed V estimated in step S24 is greater than or equal to the predetermined vehicle speed VX. Upon determining the vehicle speed V is greater than or equal to the predetermined vehicle speed VX, the controller 72 proceeds to step S26. In step S26, the controller 72 stops the motor 40 and then ends the process. In step S26, the controller 72 stops the motor 40 upon determining the motor 40 is being driven. In step S26, the controller 72 keeps the motor 40 stopped upon determining the motor 40 has been stopped. In step S25, upon determining the vehicle speed V is not greater than or equal to the predetermined vehicle speed VX, the controller 72 ends the process.

The controller 72 can be configured to set a flag for prohibiting driving of the motor 40 in steps S14, S21, and S26 and cancel the flag for prohibiting driving of the motor 40 in a case where a NO determination is given in steps S13, S20, and S25. In a case where the flag for prohibiting driving of the motor 40 is set, the controller 72 is configured not to drive the motor 40. In a case where the flag for prohibiting driving of the motor 40 is clear, the controller 72 is configured to drive the motor 40 in accordance with the human driving force H.

In a case where the crank 12 has been stopped or a case where the crank 12 is rotating freely, it is difficult to estimate the vehicle speed V in accordance with the output of the crank rotation sensor 56. In a case where the human-powered vehicle 10 is being driven by the rotation of the crank 12 and the vehicle speed sensor 54 is not in the first state, the controller 72 is configured to control the motor 40 in accordance with the output of the crank rotation sensor 56. Thus, the controller 72 can control the motor 40 in accordance with the output of the crank rotation sensor 56 in a state in which the difference between the vehicle speed V estimated in accordance with the output of the crank rotation sensor 56 and the actual vehicle speed V is small.

In a case where a YES determination is given in step S15, the controller 72 can determine whether the human torque TH is greater than or equal to a predetermined value THX. Upon determining the human torque TH is greater than or equal to the predetermined value THX, the controller 72 proceeds to step S16. Upon determining the human torque TH is less than the predetermined value THX, the controller 72 ends the process. The predetermined value THX is, for example, a value in a range greater than or equal to 5 Nm and less than or equal to 10 Nm. In this case, in a state in which the human torque TH is being transmitted to the rear wheel 14A, the controller 72 can estimate the output of the crank rotation sensor 56. Thus, the controller 72 can control the motor 40 in accordance with the output of the crank rotation sensor 56 in a state in which the difference between the vehicle speed V estimated in accordance with the output of the crank rotation sensor 56 and the actual vehicle speed V is small.

Second Embodiment

Figure 5:
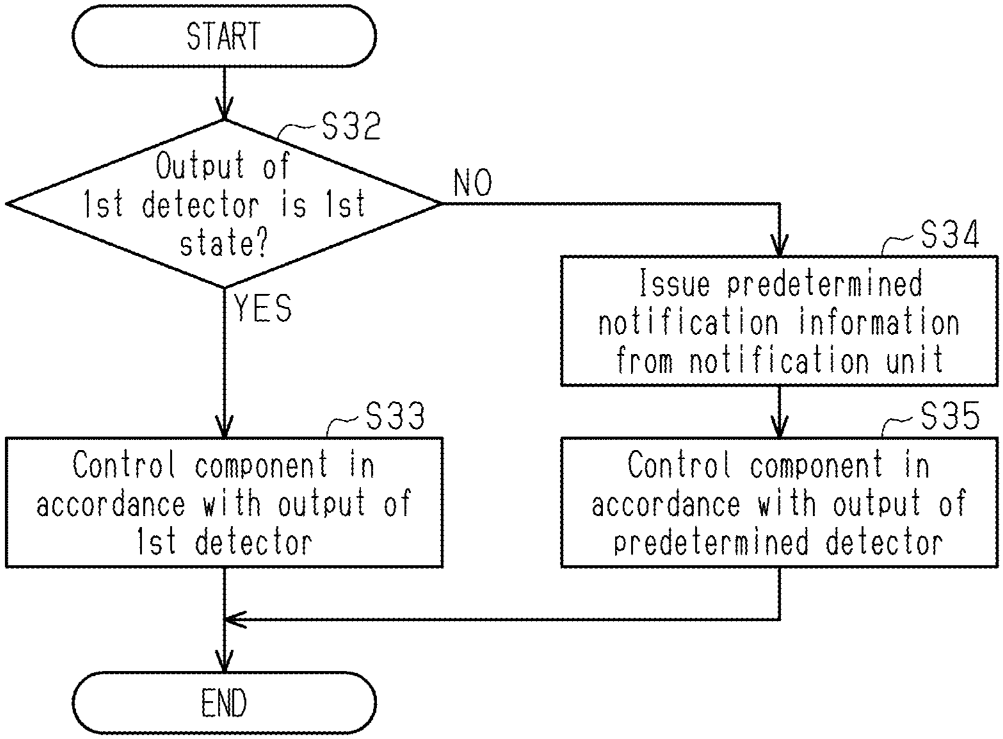
FIG. 5 is a flowchart illustrating a process executed by an electronic controller in accordance with a second embodiment to control a vehicle component.

The control device 70 in accordance with a second embodiment will now be described with reference to FIGS. 2 and 5. Same reference numerals are given to those components that are the same as the corresponding components of the first embodiment. Such components will not be described in detail.

In the present embodiment, the first detector 48 includes at least one of the vehicle speed sensor 54, the crank rotation sensor 56, the acceleration sensor 58, the position information detection sensor 60, and the motor rotation sensor 62. Further, the second detector 50 includes at least one of the vehicle speed sensor 54, the crank rotation sensor 56, the acceleration sensor 58, the position information detection sensor 60, and the motor rotation sensor 62 that differs from the first detector 48.

The controller 72 is configured to control the vehicle component 38 in accordance with the output of the first detector 48 in a case where the output of the first detector 48 is in the first state. The controller 72 is configured to control the vehicle component 38 in accordance with the output of the predetermined detector that differs from the first detector 48 among the detectors 46 in a case where the output of the first detector 48 is not in the first state. The predetermined detector includes the second detector 50. However, the combination of the sensors included in the first detector 48 and the second detector 50 is not limited. The first detector 48 can include the crank rotation sensor 56, and the second detector 50 can include the vehicle speed sensor 54. Table 1 indicates examples of combinations of the sensors included in the first detector 48 and the second detector 50.

TABLE 1

| Combination Example | 1st Detector | 2nd Detector |
|---|---|---|
| 1 | Speed Sensor | Crank Rotation Sensor |
| 2 | Speed Sensor | Acceleration Sensor |
| 3 | Speed Sensor | Position Information Detection Sensor |
| 4 | Speed Sensor | Motor Rotation Sensor |
| 5 | Crank Rotation Sensor | Speed Sensor |
| 6 | Crank Rotation Sensor | Acceleration Sensor |
| 7 | Crank Rotation Sensor | Position Information Detection Sensor |
| 8 | Crank Rotation Sensor | Motor Rotation Sensor |
| 9 | Acceleration Sensor | Speed Sensor |
| 10 | Acceleration Sensor | Crank Rotation Sensor |
| 11 | Acceleration Sensor | Position Information Detection Sensor |
| 12 | Acceleration Sensor | Motor Rotation Sensor |
| 13 | Position Information Detection Sensor | Speed Sensor |
| 14 | Position Information Detection Sensor | Crank Rotation Sensor |
| 15 | Position Information Detection Sensor | Acceleration Sensor |
| 16 | Position Information Detection Sensor | Motor Rotation Sensor |
| 17 | Motor Rotation Sensor | Speed Sensor |
| 18 | Motor Rotation Sensor | Crank Rotation Sensor |
| 19 | Motor Rotation Sensor | Acceleration Sensor |
| 20 | Motor Rotation Sensor | Position Information Detection Sensor |

A process for controlling the vehicle component 38 in accordance with the state of the output of the first detector 48 will now be described with reference to FIG. 5. In a case where electric power is supplied to the controller 72, the controller 72 starts the process from step S32 of the flowchart shown in FIG. 5. In a case where the process of the flowchart shown in FIG. 5 ends, the controller 72 repeats the process from step S32 in predetermined cycles until the supply of electric power stops.

In step S32, the controller 72 determines whether the state of the output of the first detector 48 is in the first state. In a case where the state of the output of the first detector 48 is in the first state, the controller 72 proceeds to step S33. In step S33, the controller 72 controls the vehicle component 38 in accordance with the output of the first detector 48. The controller 72 controls the motor 40 in step S33 in accordance with the output of the first detector 48, for example, in the same manner as in steps S13 and S14.

In step S32, in a case where the state of the output of the first detector 48 is not in the first state, the controller 72 proceeds to step S34. In step S34, the controller 72 issues predetermined notification information from the notification unit 42 and then proceeds to step S35. For example, the controller 72 issues a notification of an error in the first detector 48 from the notification unit 42. In step S35, the controller 72 controls the vehicle component 38 in accordance with the output of the predetermined detector. In a case where the second detector 50 is the crank rotation sensor 56, in step S35, the controller 72 controls the motor in accordance with the output of the crank rotation sensor 56, for example, in the same manner as in steps S16, S17, S19 to S21, and S22 to S26 of FIG. 4.

Third Embodiment

Figure 6:
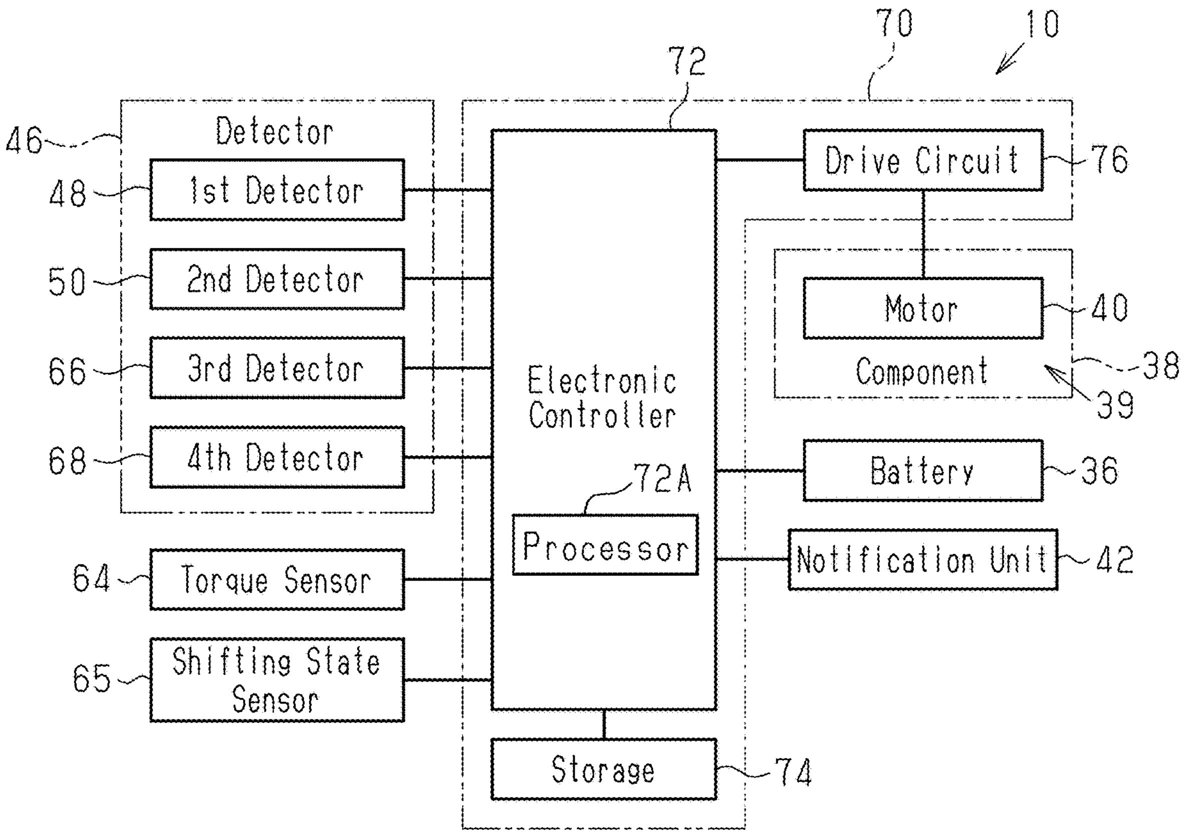
FIG. 6 is a block diagram showing an electric configuration of a human-powered vehicle including a human-powered vehicle control device in accordance with a third embodiment.

The control device 70 in accordance with a third embodiment will now be described with reference to FIGS. 6 and 7. The control device 70 in accordance with the third embodiment is the same as the control device 70 in accordance with the first and second embodiments except in that the controller 72 is configured to control the vehicle component 38 in accordance with a third detector 66 and a fourth detector 68. Thus, same reference numerals are given to those components that are the same as the corresponding components of the first and second embodiments. Such components will not be described in detail.

The detectors 46 include the first detector 48. The detectors 46 further include the second detector 50. The detectors 46 further include the third detector 66. The detectors 46 further include the fourth detector 68. The third detector 66 is configured to detect third information related to the vehicle speed V. The third information includes a third parameter P3. The first parameter P1 is correlated with the third parameter P3. The first information can be estimated from the third information. The fourth detector 68 is configured to detect fourth information related to the vehicle speed V. The fourth information includes a fourth parameter P4. The first parameter P1 is correlated with the fourth parameter P4. The first information can be estimated from the fourth information.

The first detector 48, the second detector 50, the third detector 66, and the fourth detector 68 each include different one of the vehicle speed sensor 54, the crank rotation sensor 56, the acceleration sensor 58, the position information detection sensor 60, and the motor rotation sensor 62. Preferably, the first detector 48 includes the vehicle speed sensor 54. Preferably, the second detector 50 includes at least one of the crank rotation sensor 56 and the acceleration sensor 58. Preferably, the third detector 66 includes the other one of the crank rotation sensor 56 and the acceleration sensor 58. For example, the first detector 48 includes the vehicle speed sensor 54, the second detector 50 includes the crank rotation sensor 56, the third detector 66 includes the acceleration sensor 58, the fourth detector 68 includes the position information detection sensor 60. However, the combination of the sensors of the first detector 48, the second detector 50, the third detector 66, and the fourth detector 68 is not limited. Table 2 includes two examples of the combination of the sensors included in the first detector 48, the second detector 50, the third detector 66, and the fourth detector 68. There are a number of combinations for the sensors included in the first detector 48, the second detector 50, the third detector 66, and the fourth detector 68. Thus, Table 2 indicates examples of only two preferred combinations.

TABLE 2

| Combination Example | 1st Detector | 2nd Detector | 3rd Detector | 4th Detector |
|---|---|---|---|---|
| 1 | Vehicle Speed Sensor | Crank Rotation Sensor | Acceleration Sensor | Position Info. Sensor |
| 2 | Vehicle Speed Sensor | Acceleration Sensor | Crank Rotation Sensor | Position Info. Sensor |

Preferably, the predetermined detector includes the second detector 50. In a case where the output of the first detector 48 is not in the first state and the output of the second detector 50 is in a second state, the controller 72 is configured to control the vehicle component 38 in accordance with the output of the second detector 50.

Preferably, the predetermined detector includes the third detector 66. In a case where the output of the first detector 48 is not in the first state and the output of the second detector 50 is not in the second state, the controller 72 is configured to control the vehicle component 38 in accordance with the output of the third detector 66.

In a case where the output of the second detector 50 is in the second state, the controller 72 is configured to determine that the output of the second detector 50 input to the controller 72 is normal. In a case where the output of the second detector 50 is not in the second state, the controller 72 is configured to determine that the output of the second detector 50 input to the controller 72 is not normal.

In a third example, in a case where the output of the second detector 50 is not in the second state, a signal output from the second detector 50 includes a second predetermined signal. The second predetermined signal includes an anomalous output signal of the second detector 50. The anomalous signal is generated, for example, in at least one of cases where the second detector 50 is defective, the connection between the second detector 50 and the controller 72 is anomalous, the second detector 50 differs from the predetermined configuration, and the connection between the second detector 50 and the controller 72 differs from the predetermined configuration.

In a fourth example, in a case where the output of the second detector 50 is not in the second state, the second detector 50 does not output a signal. A case where the second detector 50 does not output a signal includes at least one of cases where the human-powered vehicle 10 does not include the second detector 50, electric power is not supplied to the second detector 50, and the second detector 50 is not connected to the controller 72. In at least one of the third and fourth examples, the controller 72 can be configured to determine that the output of the second detector 50 is not in the second state.

Preferably, the predetermined detector includes the third detector 66 and the fourth detector 68. In a case where the output of the first detector 48 is not in the first state, the output of the second detector 50 is not in the second state, and the third detector 66 is in a third state, the controller 72 is configured to control the vehicle component 38 in accordance with the output of the third detector 66. In a case where the output of the first detector 48 is not in the first state, the output of the second detector 50 is not in the second state, and the third detector 66 is not in the third state, the controller 72 is configured to control the vehicle component 38 in accordance with the output of the fourth detector 68.

In a case where the output of the third detector 66 is in the third state, the controller 72 is configured to determine that the output of the third detector 66 input to the controller 72 is normal. In a case where the output of the third detector 66 is not in the third state, the controller 72 is configured to determine that the output of the third detector 66 input to the controller 72 is not normal.

In a fifth example, in a case where the output of the third detector 66 is not in the third state, a signal output from the third detector 66 includes a third predetermined signal. The third predetermined signal includes an anomalous output signal of the third detector 66. The anomalous signal is generated, for example, in at least one of cases where the third detector 66 is defective, the connection of the third detector 66 and the controller 72 is anomalous, the third detector 66 differs from the predetermined configuration, and the connection of the third detector 66 and the controller 72 differs from the predetermined configuration.

In a sixth example, in a case where the output of the third detector 66 is not in the third state, the third detector 66 does not output a signal. A case where the third detector 66 does not output a signal includes at least one of cases where the human-powered vehicle 10 does not include the third detector 66, electric power is not supplied to the third detector 66, and the third detector 66 is not connected to the controller 72. In at least one of the fifth and sixth examples, the controller 72 can be configured to determine that the output of the third detector 66 is not in the third state.

Preferably, in a case where the output of the first detector 48 is not in the first state and the output of the second detector 50 is in the second state, the controller 72 is configured to estimate the first parameter P1 in accordance with the second parameter P2 calculated from the second information and control the vehicle component 38 in accordance with the estimated first parameter P1.

Preferably, in a case where the output of the first detector 48 is in the first state and the output of the second detector 50 is in the second state, the controller 72 is configured to control the vehicle component 38 in accordance with the output of at least one of the first detector 48 and the second detector 50. Preferably, in a case where the output of the first detector 48 is not in the first state and the output of the second detector 50 is in the second state, the controller 72 is configured to control the vehicle component 38 in accordance with the output of the second detector 50 irrelevant of the output of the first detector 48. Preferably, in a case where the output of the first detector 48 is in the first state and the output of the second detector 50 is not in the second state, the controller 72 is configured to control the vehicle component 38 in accordance with the output of the first detector 48 irrelevant of the output of the second detector 50.

Preferably, in a case where the output of the first detector 48 is not in the first state, the controller 72 is configured to issue first predetermined notification information from the notification unit 42. The first predetermined notification information includes the same information as the predetermined notification information. Preferably, in a case where the output of the second detector 50 is not in the second state, the controller 72 is configured to issue second predetermined notification information from the notification unit 42. Preferably, in a case where the output of the third detector 66 is not in the third state, the controller 72 is configured to issue third predetermined notification information from the notification unit 42. The first predetermined notification information is configured to notify the user of an error in the first detector 48. The second predetermined notification information is configured to notify the user of an error in at least one of the first detector 48 and the second detector 50. Preferably, the second predetermined notification information is configured to notify the user of errors in the first detector 48 and the second detector 50. The third predetermined notification information is configured to notify the user of an error in at least one of the first detector 48, the second detector 50, and the third detector 66. Preferably, the third predetermined notification information is configured to notify the user of errors in the first detector 48, the second detector 50, and the third detector 66. In a case where the notification unit 42 includes a display unit, the first predetermined notification information, the second predetermined notification information, and the third predetermined notification information include, for example, at least one of text and graphics. In a case where the notification unit 42 includes a speaker, the first predetermined notification information, the second predetermined notification information, and the third predetermined notification information include, for example, at least one of voice and warning sounds. Preferably, in a case where the output of the first detector 48 is not in the first state, the controller 72 is configured to continuously issue notification from the notification unit 42 until the first detector 48 shifts to the first state. The controller 72 can be configured to issue notification from the notification unit 42, for example, continuously or intermittently until the output of the first detector 48 shifts to the first state and the output of the second detector shifts to the second state. The controller 72 can be configured to issue notification from the notification unit 42, for example, continuously or intermittently until the output of the first detector 48 shifts to the first state, the output of the second detector shifts to the second state, and the output of the third detector shifts to the third state.

A process for controlling the vehicle component 38 in accordance with the state of the output of the first detector 48 will now be described with reference to FIG. 7. In a case where electric power is supplied to the controller 72, the controller 72 starts the process from step S42 of the flowchart shown in FIG. 7. In a case where the process of the flowchart shown in FIG. 7 ends, the controller 72 repeats the process from step S42 in predetermined cycles until the supply of electric power stops.

In step S42, the controller 72 determines whether the state of the output of the first detector 48 is in the first state. In a case where the state of the output of the first detector 48 is in the first state, the controller 72 proceeds to step S43. In step S43, the controller 72 controls the vehicle component 38 in accordance with the output of the first detector 48. The controller 72 controls the motor 40 in step S43 in accordance with the output of the first detector 48, for example, in the same manner as in steps S13 and S14.

In step S42, in a case where the state of the output of the first detector 48 is not in the first state, the controller 72 proceeds to step S44. In step S44, the controller 72 determines whether the state of the output of the second detector 50 is in the second state. In a case where the state of the output of the second detector 50 is in the second state, the controller 72 proceeds to step S45. In step S45, the controller 72 issues the first predetermined notification information from the notification unit 42 and then proceeds to step S46. In step S46, the controller 72 controls the vehicle component 38 in accordance with the output of the second detector 50. In step S46, in a case where the second detector 50 is the crank rotation sensor 56, the controller 72 controls the motor in accordance with the output of the crank rotation sensor 56, for example, in the same manner as in steps S16, S17, S19 to S21, and S22 to S26 of FIG. 4.

In step S44, in a case where the state of the output of the second detector 50 is not in the second state, the controller 72 proceeds to step S47. In step S47, the controller 72 determines whether the state of the output of the third detector 66 is in the third state. In a case where the state of the output of the third detector 66 is in the third state, the controller 72 proceeds to step S48. In step S48, the controller 72 issues the second predetermined notification information from the notification unit 42 and then proceeds to step S49. In step S49, the controller 72 controls the vehicle component 38 in accordance with the output of the third detector 66. In step S49, in a case where the third detector 66 includes the acceleration sensor 58, the controller 72 controls the motor 40 using the vehicle speed V estimated from the output of the acceleration sensor 58 in the same manner as in steps S13 and S14 of FIG. 3.

In step S47, in a case where the state of the output of the third detector 66 is not in the third state, the controller 72 proceeds to step S50. In step S50, the controller 72 issues the third predetermined notification information from the notification unit 42 and then proceeds to step S51. In step S51, the controller 72 controls the vehicle component 38 in accordance with the output of the fourth detector 68. In step S51, in a case where the fourth detector 68 includes the position information detection sensor 60, the controller 72 controls the motor 40 using the vehicle speed V estimated from the output of the position information detection sensor 60 in the same manner as in steps S13 and S14 of FIG. 3.

Fourth Embodiment

The control device 70 in accordance with a fourth embodiment will now be described with reference to FIGS. 2 and 8. The control device 70 in accordance with the fourth embodiment is the same as the control device 70 in accordance with the first embodiment except in that the controller 72 is configured to control the vehicle component 38 so that the vehicle component 38 is in a predetermined state in accordance with the state of the output of the first detector 48 and the state of the output of the second detector 50. Thus, same reference numerals are given to those components that are the same as the corresponding components of the first embodiment. Such components will not be described in detail.

In the present embodiment, the human-powered vehicle 10 includes the human-powered vehicle component 38 and a plurality of detectors 46 configured to detect information related to the vehicle speed V of the human-powered vehicle 10 in which the information related to the vehicle speed V differs between the detectors 46. The detectors 46 include the first detector 48 and the second detector 50.

The control device 70 includes the controller 72. In a case where the output of the first detector 48 is in the first state and the output of the second detector 50 is in the second state, the controller 72 controls the vehicle component 38 in accordance with at least one of the output of the first detector 48 and the output of the second detector 50. In a case where the output of the first detector 48 is not in the first state, the controller 72 controls the vehicle component 38 so that the vehicle component 38 is in the predetermined state irrelevant of the output of the second detector 50. In a case where the output of the second detector 50 is not in the second state, the controller 72 controls the vehicle component 38 so that the vehicle component 38 is in the predetermined state irrelevant of the output of the first detector 48.

Preferably, the first detector 48 is configured to detect the third information related to the vehicle speed V, the second detector 50 is configured to detect the fourth information related to the vehicle speed V, and the third information is correlated with the fourth information. In the present embodiment, for example, the combinations indicated in Table 1 of the second embodiment are applicable as combinations of the first detector 48 and the second detector 50.

Preferably, in a case where the output of the first detector 48 is in the first state and the output of the second detector 50 is in the second state, the controller 72 is configured to control the vehicle component 38 in accordance with both of the third information and the fourth information. Preferably, in a case where the output of the first detector 48 is in the first state and the output of the second detector 50 is in the second state, the controller 72 executes a control associated with the third information on the vehicle component 38 and then executes a control associated with the fourth information on the vehicle component 38. For example, in a case where one of the first detector 48 and the second detector 50 includes the vehicle sensor 54, the other one of the first detector 48 and the second detector 50 includes the crank rotation sensor 56, the output of the first detector 48 is in the first state, and the output of the second detector 50 is in the second state, the controller 72 controls the vehicle component 38 in accordance with the vehicle speed V corresponding to the output of the vehicle sensor 54 and then controls the vehicle component 38 in accordance with the rotational speed N of the crank 12 corresponding to the output of the crank rotation sensor 56. Preferably, in a case where the output of the first detector 48 is in the first state and the output of the second detector 50 is in the second state, the controller 72 does not control the vehicle component 38 with the fourth information estimated from the third information or the third information estimated from the fourth information.

In the present embodiment, it is preferred that the vehicle component 38 include the electric actuator 39. The predetermined state includes a state in which the electric actuator 39 is not actuated. In a case where the electric actuator 39 is the motor 40, it is preferred that the predetermined state include a state in which the motor 40 is stopped. In a case where the electric actuator 39 is the motor 40, the predetermined state can include a state in which the assist force M generated by the motor 40 is restricted.

A process for controlling the vehicle component 38 in accordance with the state of the outputs of the detectors 46 will now be described with reference to FIG. 8. In a case where electric power is supplied to the controller 72, the controller 72 starts the process from step S81 of the flowchart shown in FIG. 8. In a case where the process of the flowchart shown in FIG. 8 ends, the controller 72 repeats the process from step S81 in predetermined cycles until the supply of electric power stops.

In step S81, the controller 72 determines whether the output of the first detector 48 is in the first state. In a case where the output of the first detector 48 is in the first state, the controller 72 proceeds to step S82. In step S82, the controller 72 determines whether the output of the second detector 50 is in the second state. In a case where the output of the second detector 50 is in the second state, the controller 72 proceeds to step S83. In step S83, the controller 72 controls the vehicle component 38 in accordance with the output of the first detector 48 and the output of the second detector 50 and then ends the process.

In step S81, in a case where the output of the first detector 48 is not in the first state, the controller 72 proceeds to step S84. In step S82, in a case where the output of the second detector 50 is not in the second state, the controller 72 proceeds to step S84. The controller 72 can switch the contents of the processes in steps S81 and S82. In a case where the output of the first detector 48 is not in the first state and the output of the second detector 50 is not in the second state in steps S81 and S82, the controller 72 proceeds to step S84.

In step S84, the controller 72 issues the predetermined notification information from the notification unit 42 and then proceeds to step S85. In step S85, the controller 72 controls the vehicle component 38 so that the vehicle component 38 is in the predetermined state and then ends the process.

Fifth Embodiment

Figure 9:
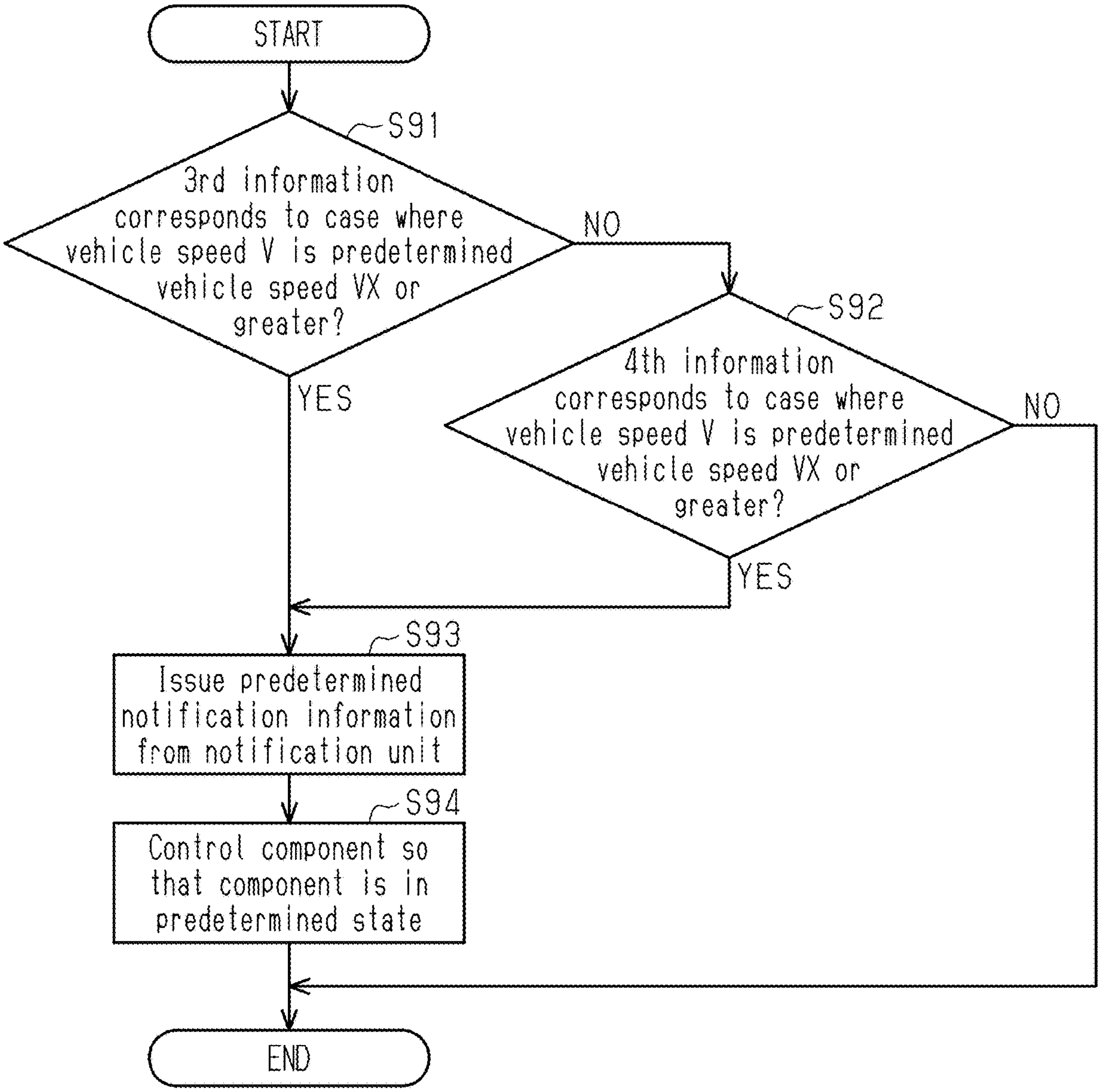
FIG. 9 is a flowchart illustrating a process executed by an electronic controller in accordance with a fifth embodiment to control a vehicle component.

The control device 70 in accordance with a fifth embodiment will now be described with reference to FIGS. 2 and 9. The control device 70 in accordance with the fifth embodiment is the same as the control device 70 in accordance with the first embodiment except in that the controller 72 is configured to control the vehicle component 38 so that the vehicle component 38 is in the predetermined state in accordance with the third information and the fourth information. Thus, same reference numerals are given to those components that are the same as the corresponding components of the first embodiment. Such components will not be described in detail.

In the present embodiment, the human-powered vehicle 10 includes the human-powered vehicle component 38 and a plurality of detectors 46 configured to detect information related to the vehicle speed V of the human-powered vehicle 10 in which the information related to the vehicle speed V differs between the detectors 46. The detectors 46 include the first detector 48 and the second detector 50.

The control device 70 includes the controller 72. In a case where at least one of the third information related to the vehicle speed V of the human-powered vehicle 10 output from the first detector 48 and the fourth information related to the vehicle speed V of the human-powered vehicle 10 output from the second detector 50 corresponds to a case where the vehicle speed V of the human-powered vehicle 10 is greater than or equal to the predetermined vehicle speed VX, the controller 72 controls the vehicle component 38 so that the vehicle component 38 in the predetermined state. In the present embodiment, for example, the combinations indicated in Table 1 of the second embodiment are applicable as combinations of the first detector 48 and the second detector 50. For example, in a case where the first detector 48 is the vehicle sensor 54 and the second detector 50 is the crank rotation sensor 56, the third information is the vehicle speed V, which is calculated in accordance with the output of the vehicle sensor 54, and the fourth information is the vehicle speed V, which is estimated in accordance with the output of the crank rotation sensor 56.

Preferably, in a case where one of the third information and the fourth information corresponds to the case where the vehicle speed V of the human-powered vehicle 10 is greater than or equal to the predetermined vehicle speed VX, the controller 72 controls the vehicle component 38 so that the vehicle component 38 is in the predetermined state. In a case where one of the third information and the fourth information corresponds to the case where the vehicle speed V of the human-powered vehicle 10 is greater than or equal to the predetermined vehicle speed VX, the controller 72 controls the vehicle component 38 so that the vehicle component 38 is in the predetermined state. Thus, for example, even if the first detector 48 is not in the first state or a case where the second detector 50 is not in the second state, the vehicle component 38 will always be in the predetermined state in a case where the vehicle speed V is greater than or equal to the predetermined vehicle speed VX.

In the present embodiment, it is preferred that the vehicle component 38 include the electric actuator 39. The predetermined state includes a state in which the electric actuator 39 is not actuated. In a case where the electric actuator 39 is the motor 40, the predetermined state includes a state in which the motor 40 is stopped. In a case where the electric actuator 39 is the motor 40, the predetermined state includes a state in which the assist force M generated by the motor 40 is restricted.

Preferably, in a case where at least one of the third information and the fourth information corresponds to the case where the vehicle speed V of the human-powered vehicle 10 is greater than or equal to the predetermined vehicle speed VX, the controller 72 issues the predetermined notification information from the notification unit 42. The predetermined notification information is configured to notify the user of a state in which at least one of the third information and the fourth information corresponds to the case where the vehicle speed V of the human-powered vehicle 10 is greater than or equal to the predetermined vehicle speed VX. In a case where the notification unit 42 includes a display unit, the predetermined notification information includes, for example, at least one of text and graphics. In a case where the notification unit 42 includes a speaker, the predetermined notification information includes, for example, at least one of voice and warning sounds. In a case where the output of the first detector 48 is not in the first state, the controller 72 can issue notification from the notification unit 42, for example, continuously or intermittently until the output of the first detector 48 shifts to the first state.

A process for controlling the vehicle component 38 in accordance with the state of the outputs of the detectors 46 will now be described with reference to FIG. 9. In a case where electric power is supplied to the controller 72, the controller 72 starts the process from step S91 of the flowchart shown in FIG. 9. In a case where the process of the flowchart shown in FIG. 9 ends, the controller 72 repeats the process from step S91 in predetermined cycles until the supply of electric power stops.

In step S91, the controller 72 determines whether the third information corresponds to the case where the vehicle speed V is greater than or equal to the predetermined vehicle speed VX. In a case where the third information does not correspond to the case where the vehicle speed V is greater than or equal to the predetermined vehicle speed VX, the controller 72 proceeds to step S92. In step S92, the controller 72 determines whether the fourth information corresponds to the case where the vehicle speed V is greater than or equal to the predetermined vehicle speed VX. In a case where the fourth information does not correspond to the case where the vehicle speed V is greater than or equal to the predetermined vehicle speed VX, the controller 72 ends the process.

In step S91, in a case where the third information corresponds to the case where the vehicle speed V is greater than or equal to the predetermined vehicle speed VX, the controller 72 proceeds to step S93. In step S92, in a case where the fourth information corresponds to the case where the vehicle speed V is greater than or equal to the predetermined vehicle speed VX, the controller 72 proceeds to step S93. The controller 72 can switch the contents of processes in steps S91 and S92. In a case where the third information corresponds to the case where the vehicle speed V is greater than or equal to the predetermined vehicle speed VX and the fourth information corresponds to the case where the vehicle speed V is greater than or equal to the predetermined vehicle speed VX in steps S91 and S92, the controller 72 proceeds to step S93.

In step S93, the controller 72 issues the predetermined notification information from the notification unit 42 and then proceeds to step S94. In step S94, the controller 72 controls the vehicle component 38 so that the vehicle component 38 is in the predetermined state and then ends the process.

Modifications

The description related with the above embodiments exemplifies, without any intention to limit, an applicable form of a human-powered vehicle control device according to the present disclosure. In addition to the embodiments described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

Figure 3:
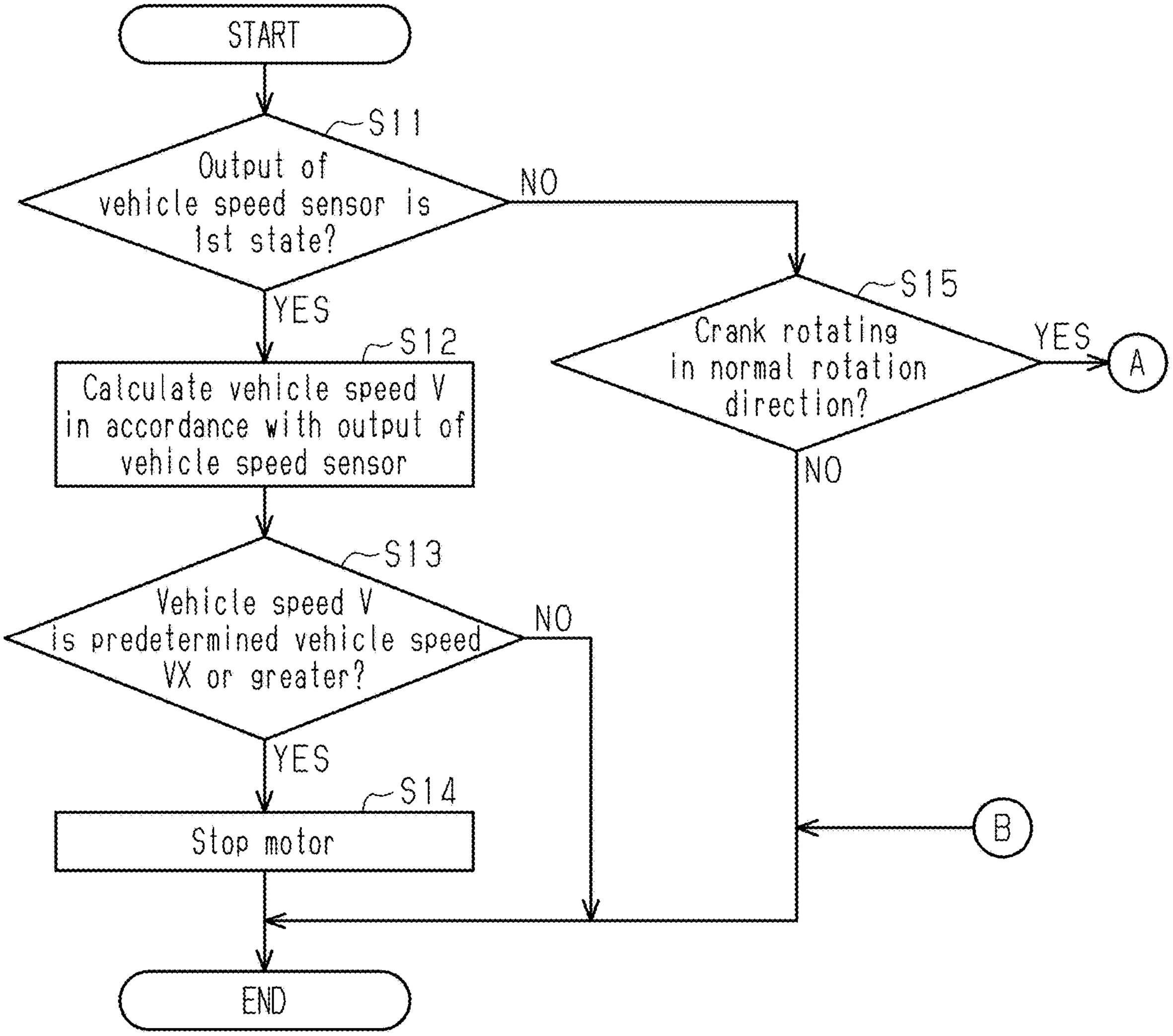
FIG. 3 is a first part of a flowchart illustrating a process executed by an electronic controller of FIG. 2 to control a vehicle component.
Figure 4:
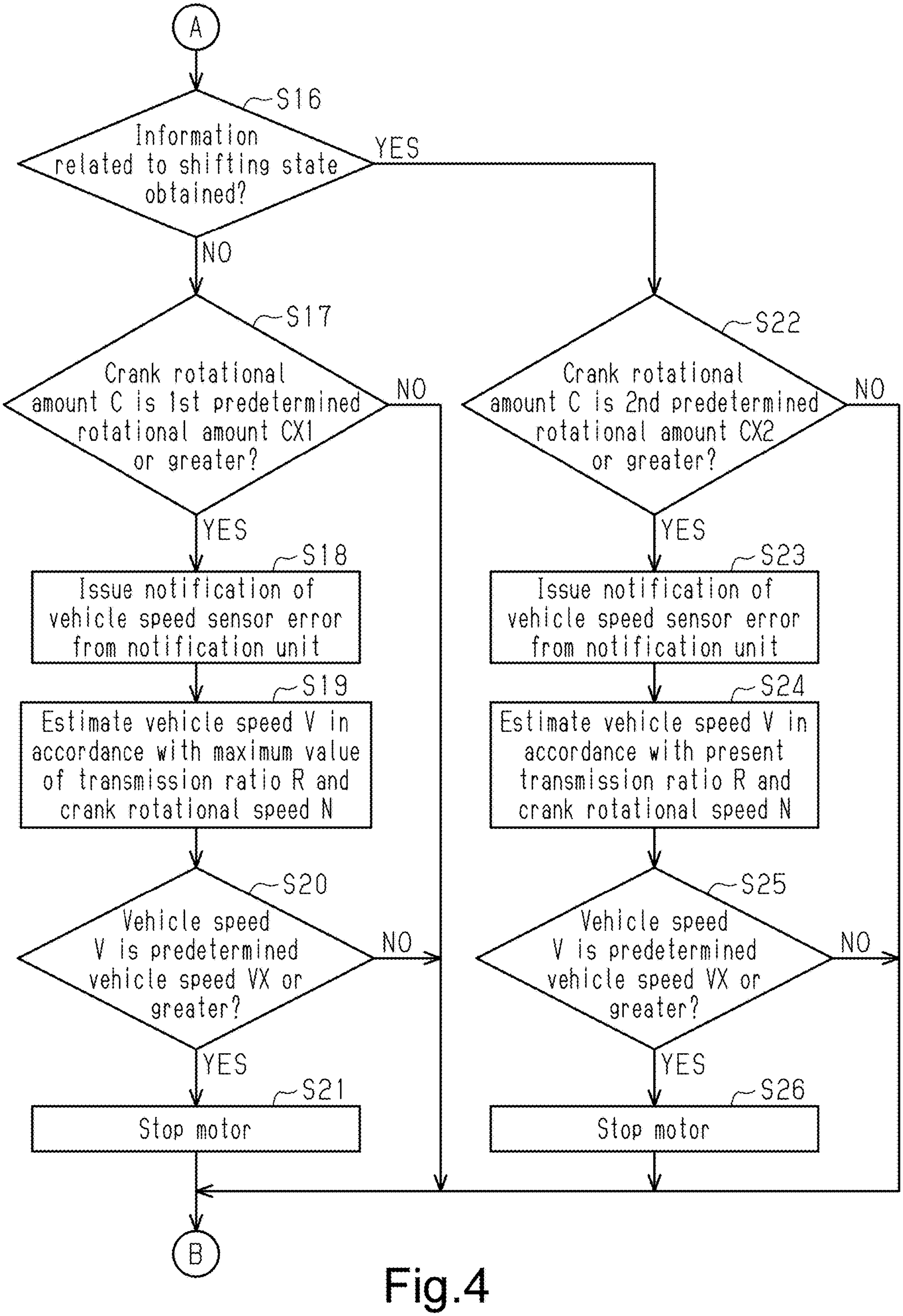
FIG. 4 is a second part of a flowchart illustrating the process executed by the electronic controller of FIG. 2 to control the vehicle component.

In the first embodiment and its modifications, step S16 and steps S22 to S26 can be omitted from the flowchart shown in FIGS. 3 and 4. In this case, in a case where a YES determination is given in step S15, the controller 72 proceeds to step S17.

In the first embodiment and its modifications, steps S16 to S21 can be omitted from the flowchart shown in FIGS. 3 and 4. In this case, in a case where a YES determination is given in step S15, the controller 72 proceeds to step S22. In this modification, the human-powered vehicle 10 includes the shifting state sensor 65 that detects the transmission ratio R of the human-powered vehicle 10, and the controller 72 estimates the vehicle speed V from the present transmission ratio R obtained in accordance with the output of the shifting state sensor 65.

In the third embodiment and its modifications, the detectors 46 can include more than five detectors 46. In this case, if the first detector 48, the second detector 50, the third detector 66, and the fourth detector 68 cannot be used to control the vehicle component 38, the controller 72 controls the vehicle component 38 in accordance with an output of the detector 46 excluding the first detector 48, the second detector 50, the third detector 66, and the fourth detector 68 among the detectors 46. In a case where the fourth detector 68 is in a fourth state, the controller 72 is configured to determine that the output of the fourth detector 68 input to the controller 72 is normal. In a case where the output of the fourth detector 68 is not in the fourth state, the controller 72 is configured to determine that the output of the fourth detector 68 input to the controller 72 is not normal.

In a seventh example, in a case where the output of the fourth detector 68 is not in the fourth state, the fourth detector 68 outputs a signal including a fourth predetermined signal. The fourth predetermined signal includes an anomalous output signal of the fourth detector 68. The anomalous signal is generated, for example, in at least one of cases where the fourth detector 68 is defective, the connection of the fourth detector 68 and the controller 72 is anomalous, the fourth detector 68 differs from the predetermined configuration, and the connection of the fourth detector 68 and the controller 72 differs from the predetermined configuration.

In an eighth example, in a case where the output of the fourth detector 68 is not in the fourth state, the fourth detector 68 does not output a signal. A case where the fourth detector 68 does not output a signal includes at least one of cases where the human-powered vehicle 10 does not include the fourth detector 68, electric power is not supplied to the fourth detector 68, and the fourth detector 68 is not connected to the controller 72. In at least one of the seventh and eighth examples, the controller 72 can be configured to determine that the output of the fourth detector 68 is not in the fourth state. In a case where the output of the first detector 48 is not in the first state, the output of the second detector 50 is not in the second state, the third detector 66 is not in the third state, and the fourth detector 68 is not in the fourth state, the controller 72 is configured to control the vehicle component 38 in accordance with the output of the detector 46 excluding the first detector 48, the second detector 50, the third detector 66, and the fourth detector 68.

Figure 7:
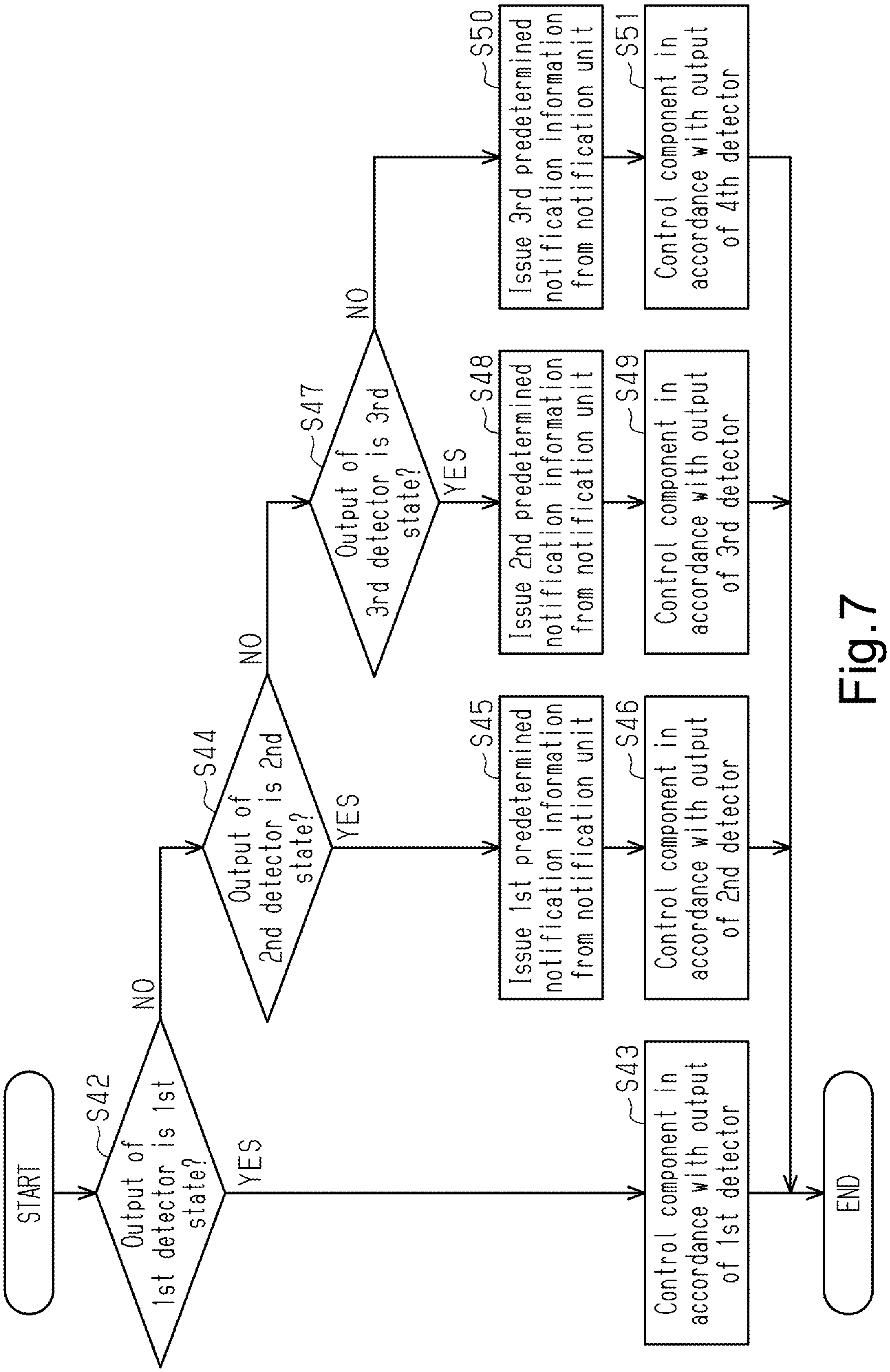
FIG. 7 is a flowchart illustrating a process executed by an electronic controller of FIG. 6 to control a component.
Figure 8:
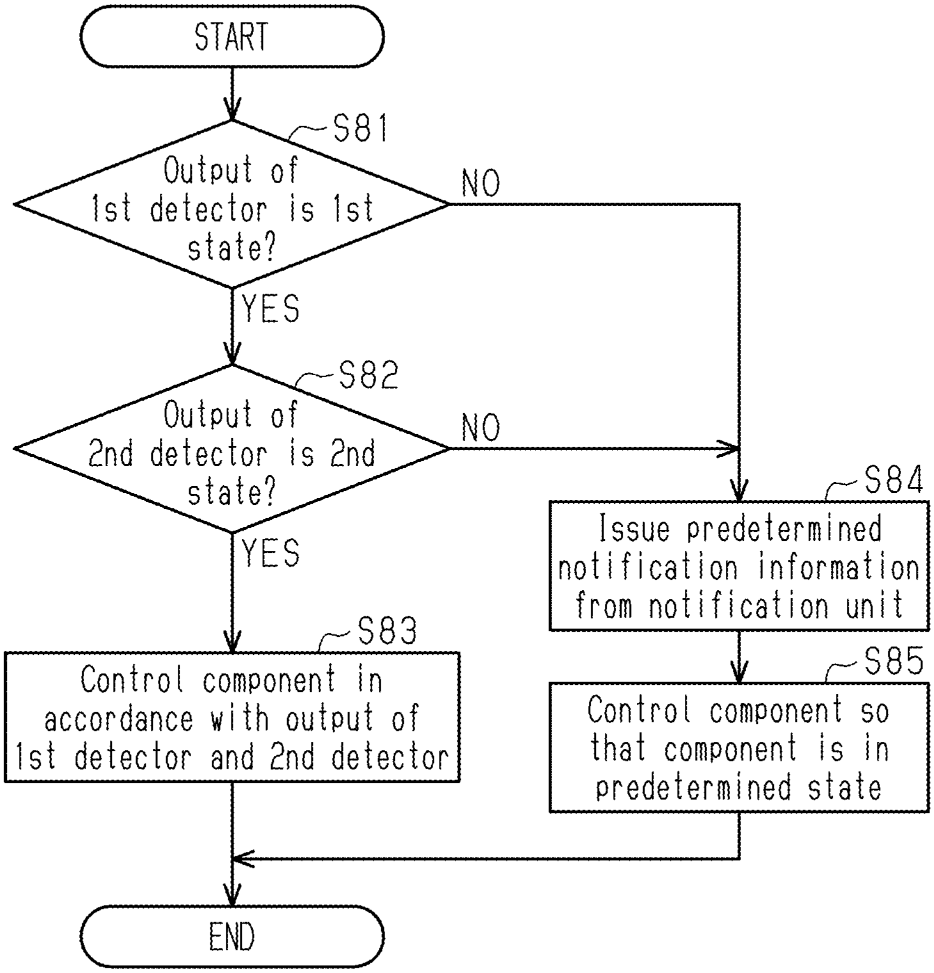
FIG. 8 is a flowchart illustrating a process executed by an electronic controller in accordance with a fourth embodiment to control a vehicle component.

In the third embodiment and its modifications, steps S47, S50, and S51 can be omitted from the flowchart of FIG. 7 as shown in FIG. 8. In the flowchart shown in FIG. 8, in a case where a NO determination is given in step S44, the controller 72 proceeds to step S48. In this modification, the detectors 46 do not have to include the fourth detector 68.

Figure 11:
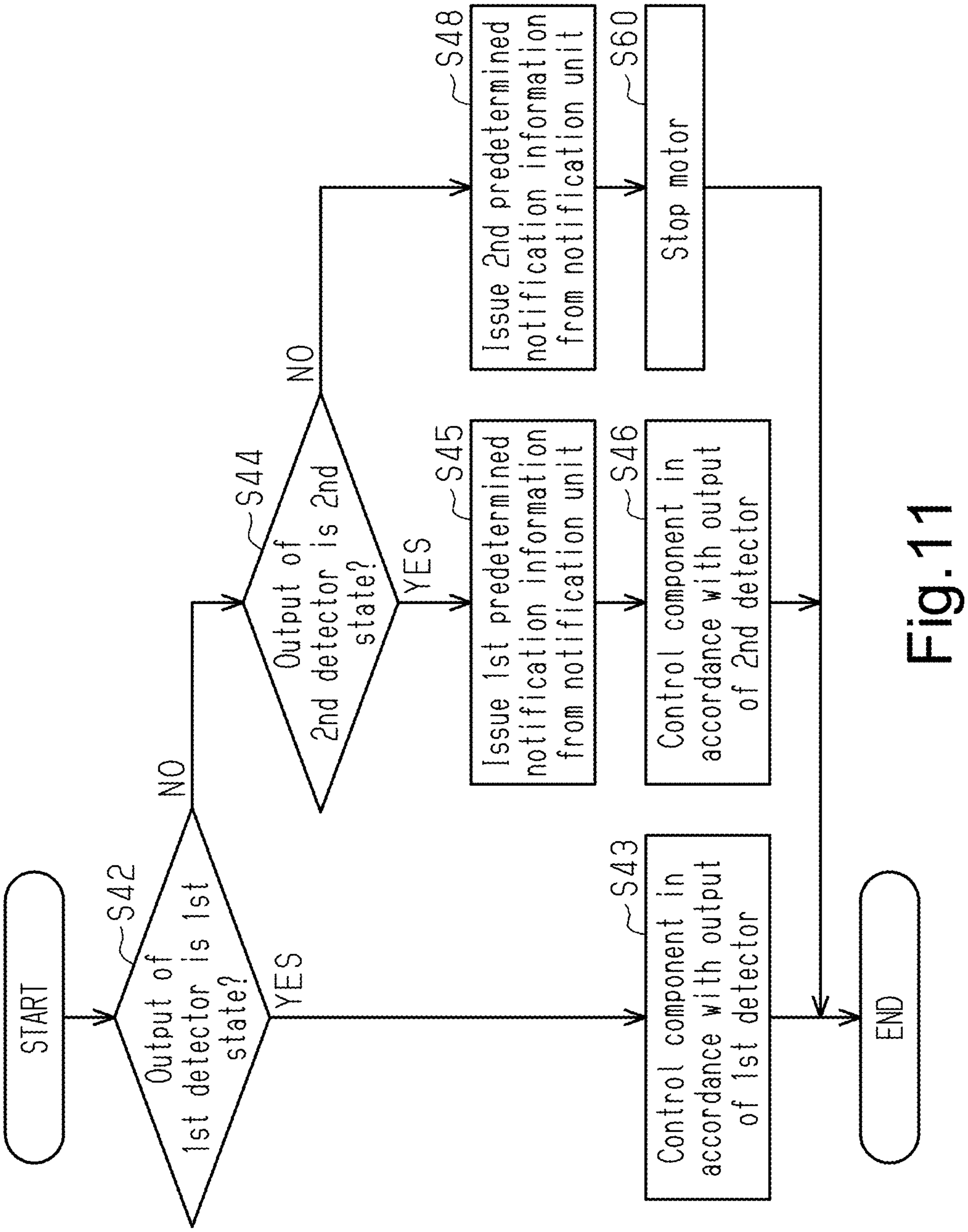
FIG. 11 is a flowchart illustrating a process executed by an electronic controller in accordance with a second modification of the third embodiment to control a vehicle component.

In the second and third embodiments and its modifications, in a case where none of the detectors 46 can be used to control the vehicle component 38, the controller 72 can be configured to stop the control of the vehicle component 38 or execute control for stopping the vehicle component 38. In a state in which none of the detectors 46 can be used to control the vehicle component 38 and the vehicle component 38 includes the motor 40, the controller 72 can be configured to stop the motor 40. The state in which the first detector 48 cannot be used to control the vehicle component 38 corresponds to a case where the first detector 48 is not in the first state. The state in which the second detector 50 cannot be used to control the vehicle component 38 corresponds to a case where the second detector 50 is not in the second state. The state in which the third detector 66 cannot be used to control the vehicle component 38 corresponds to a case where the third detector 66 is not in the third state. The state in which the fourth detector 68 cannot be used to control the vehicle component 38 corresponds to a case where the fourth detector 68 is not in the fourth state. For example, step S49 of FIG. 8 is changed to step S60 of FIG. 11. In the flowchart shown in FIG. 11, the controller 72 proceeds to step S60 after executing step S48. In step S60, the controller 72 stops the motor 40 and then ends the process. The controller 72 stops the motor 40 in step S60 in a case where the motor 40 is being driven. In step S60, the controller 72 keeps the motor 40 stopped in a case where the motor 40 has been stopped.

In the first embodiment and its modifications, in a case where the output of the vehicle speed sensor 54 is not in the first state and the output of the crank rotation sensor 56 is the second state, the controller 72 can be configured to stop the control of the vehicle component 38 or execute control for stopping the vehicle component 38. For example, in a case where a YES determination is given in step S15, the controller 72 can be configured to determine whether the output of the crank rotation sensor 56 is in the second state. In a case where the output of the crank rotation sensor 56 is in the second state, the controller 72 can proceed to step S16, S17, or S18.

In the second and third embodiments and its modifications, in a case where the output of the first detector 48 is in the first state and the output of the second detector 50 is not in the second state, the controller 72 can be configured to estimate the second parameter P2 in accordance with the first parameter P1 calculated from the first information and control the vehicle component 38 in accordance with the estimated second parameter P2. For example, in a case where the first detector 48 is the vehicle speed sensor 54, the second detector 50 is the crank rotation sensor 56, the output of the first detector 48 is in the first state, and the output of the second detector 50 is not in the second state, the controller 72 is configured to control the vehicle component 38 in accordance with the rotational speed N of the crank 12 estimated from the vehicle speed V calculated from the output of the vehicle speed sensor 54. For example, the controller 72 is configured to estimate the rotational speed N of the crank 12 by dividing the vehicle speed V by the transmission ratio R and the circumferential length of the rear wheel 14A.

In the first, second, third, fourth, and fifth embodiments and its modifications, the vehicle component 38 can include a vehicle component other than the motor 40. For example, the vehicle component 38 includes at least one of the notification unit 42, the transmission 44, an electric brake device, an electric adjustable seatpost, an electric suspension, and a lamp instead of or in addition to the motor 40. In a case where the modification includes the fourth embodiment, fifth embodiment, modifications of the fourth embodiment, or modifications of the fifth embodiment, the predetermined state can be a state in which the vehicle component 38 is driven at a limited frequency. For example, in a case where the vehicle component 38 includes the transmission 44, the predetermined state includes a state in which the transmission ratio R is changed by the transmission 44 at a limited frequency.

In the second and third embodiments and their modifications, at least one of the first detector 48 and the second detector 50 can be a sensor that does not detect the information related to the vehicle speed V. In this case, the first information detected by the first detector 48 is correlated with the second information detected by the second detector 50. This allows the controller 72 to control the vehicle component 38 in a preferred manner. For example, the first detector 48 includes an inclination sensor that detects a pitch angle of the vehicle body 16 of the human-powered vehicle 10, and the second detector 50 includes the position information detection sensor 60. The controller 72 is configured to estimate the pitch angle of the vehicle body 16 of the human-powered vehicle 10 from the position information received by the GPS receiver using gradient information of the road included in the map information stored in advance in the storage 74. In a case where the output of the first detector 48 is in the first state and the output of the second detector 50 is in the second state, the controller 72 is configured to control the vehicle component 38 in accordance with the output of at least one of the first detector 48 and the second detector 50. In a case where the output of the first detector 48 is not in the first state and the output of the second detector 50 is in the second state, the controller 72 is configured to control the vehicle component 38 in accordance with the output of the second detector 50 irrelevant of the output of the first detector 48. In a case where the output of the first detector 48 is in the first state and the output of the second detector 50 is not in the second state, the controller 72 is configured to control the vehicle component 38 in accordance with the output of the first detector 48 irrelevant of the output of the second detector 50.

Figure 12:
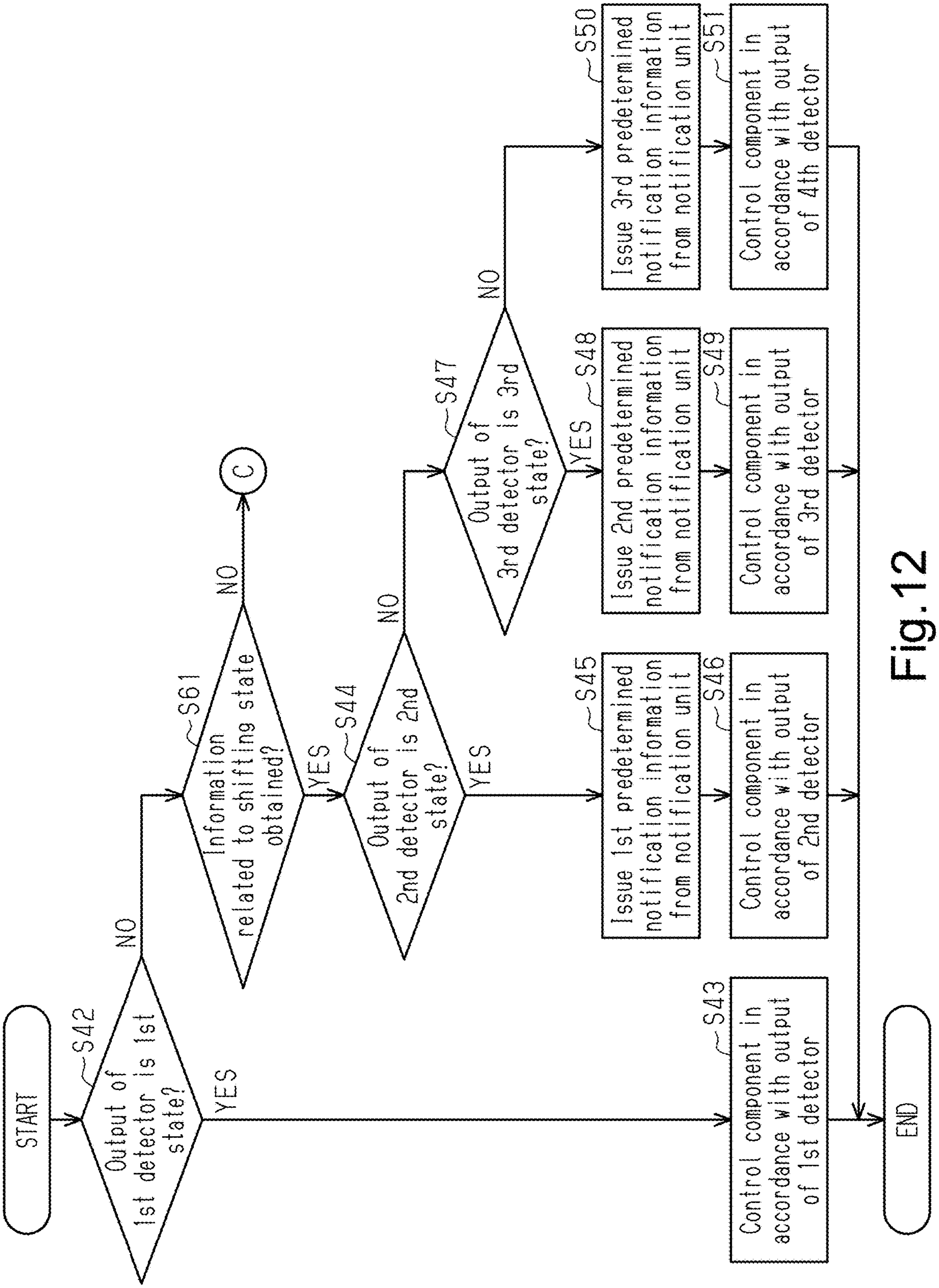
FIG. 12 is a first part of a flowchart illustrating a process executed by an electronic controller in accordance with a third modification of the third embodiment to control a vehicle component.
Figure 13:
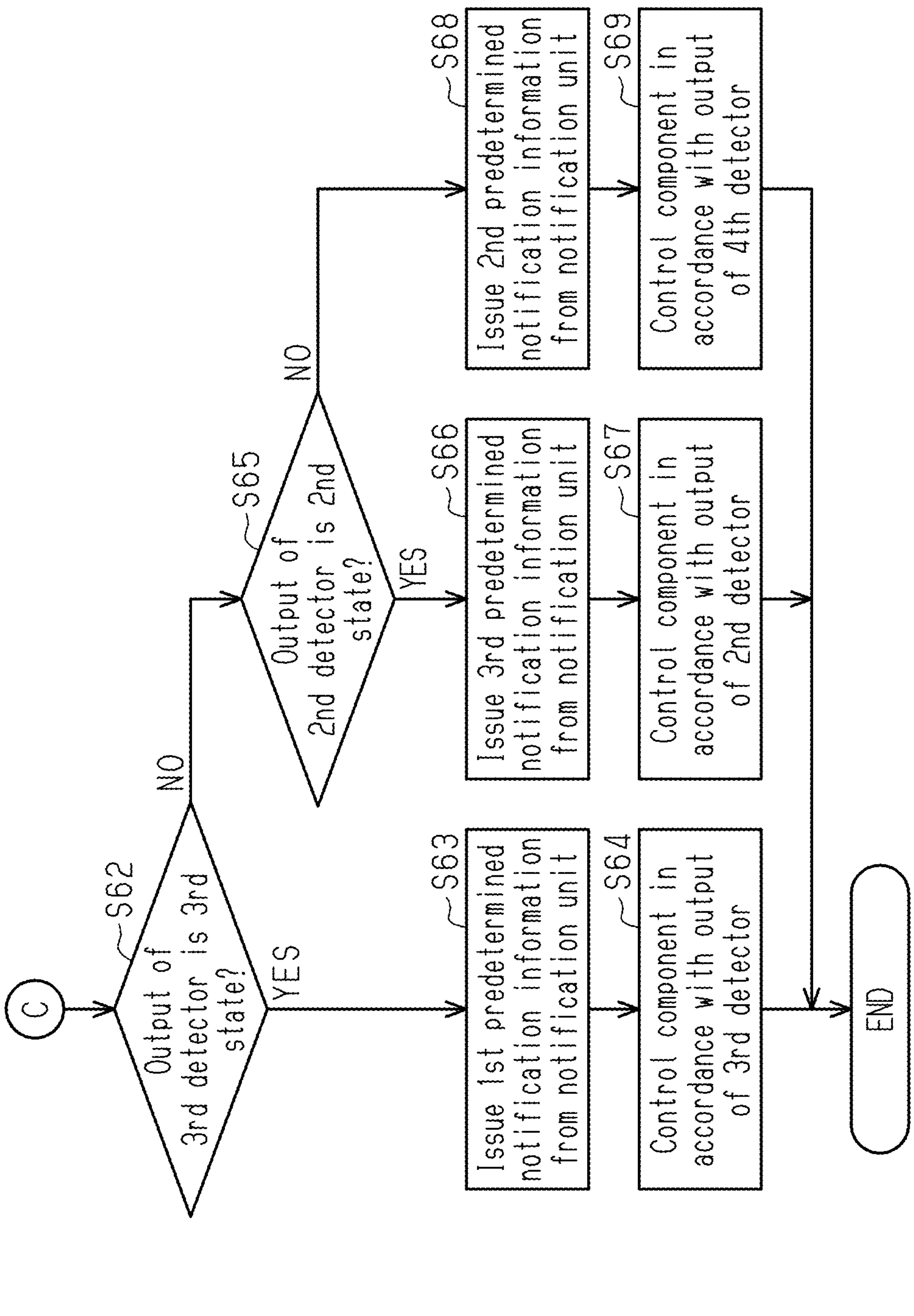
FIG. 13 is a second part of the flowchart illustrating the process executed by the electronic controller in accordance with the third modification of the third embodiment to control the vehicle component.

In the third embodiment and its modifications, the controller 72 can be configured to execute processes that differ between a case where the information related to the shift stage is obtained and a case where the information related to the shift stage is not obtained. For example, in a case where a NO determination is given in step S42 of FIG. 7, the controller 72 proceeds to step S61 of FIG. 12. In step S61, the controller 72 determines whether information related to the shift stage has been obtained. In a case where the controller 72 determines that information related to the shift stage has been obtained, the controller 72 proceeds to step S44. From step S44, the controller 72 executes the same process as that illustrated in FIG. 7. In a case where the information related to a shift state has not been obtained, the controller 72 proceeds to step S62 of FIG. 13. In step S62, the controller 72 determines whether the output of the third detector 66 is in the third state. In a case where the output of the third detector 66 is in the third state, the controller 72 proceeds to step S63. In step S63, the controller 72 issues the first predetermined notification information from the notification unit 42 and then proceeds to step S64. In step S64, the controller 72 controls the vehicle component 38 in accordance with the output of the third detector 66. In step S62, in a case where the output of the third detector 66 is not in the third state, the controller 72 proceeds to step S65. In step S65, the controller 72 determines whether the state of the output of the second detector 50 is in the second state. In a case where the state of the output of the second detector 50 is in the second state, the controller 72 proceeds to step S66. In step S66, the controller 72 issues the third predetermined notification information from the notification unit 42 and then proceeds to step S67. In step S67, the controller 72 controls the vehicle component 38 in accordance with the output of the third detector 66 and then ends the process. In step S65, in a case where the output of the second detector 50 is not in the second state, the controller 72 proceeds to step S68. In step S68, the controller 72 issues the second predetermined notification information from the notification unit 42 and then proceeds to step S69. In step S69, the controller 72 controls the vehicle component 38 in accordance with the output of the fourth detector 68 and then ends the process. In this modification, for example, if the two detection units 46A and 46B different from each other are provided, the control unit 72 can control the vehicle component 38 by preferentially using one of the detection units 46A and 46B. The detection unit 46A can more appropriately estimate the first parameter P1 than the detection unit 46B if, for example, information about the shift stage can be acquired. The detection unit 46B can more appropriately estimate the first parameter P1 than the detection unit 46A if, for example, information about the shift stage can be acquired. If the information about the shift stage can be acquired, the control unit 72 can control the vehicle component 38 by preferentially using the detection unit 46A. If the information about the shift stage cannot be acquired, the control unit 72 can control the vehicle component 38 by preferentially using the detection unit 46B.

Figure 14:
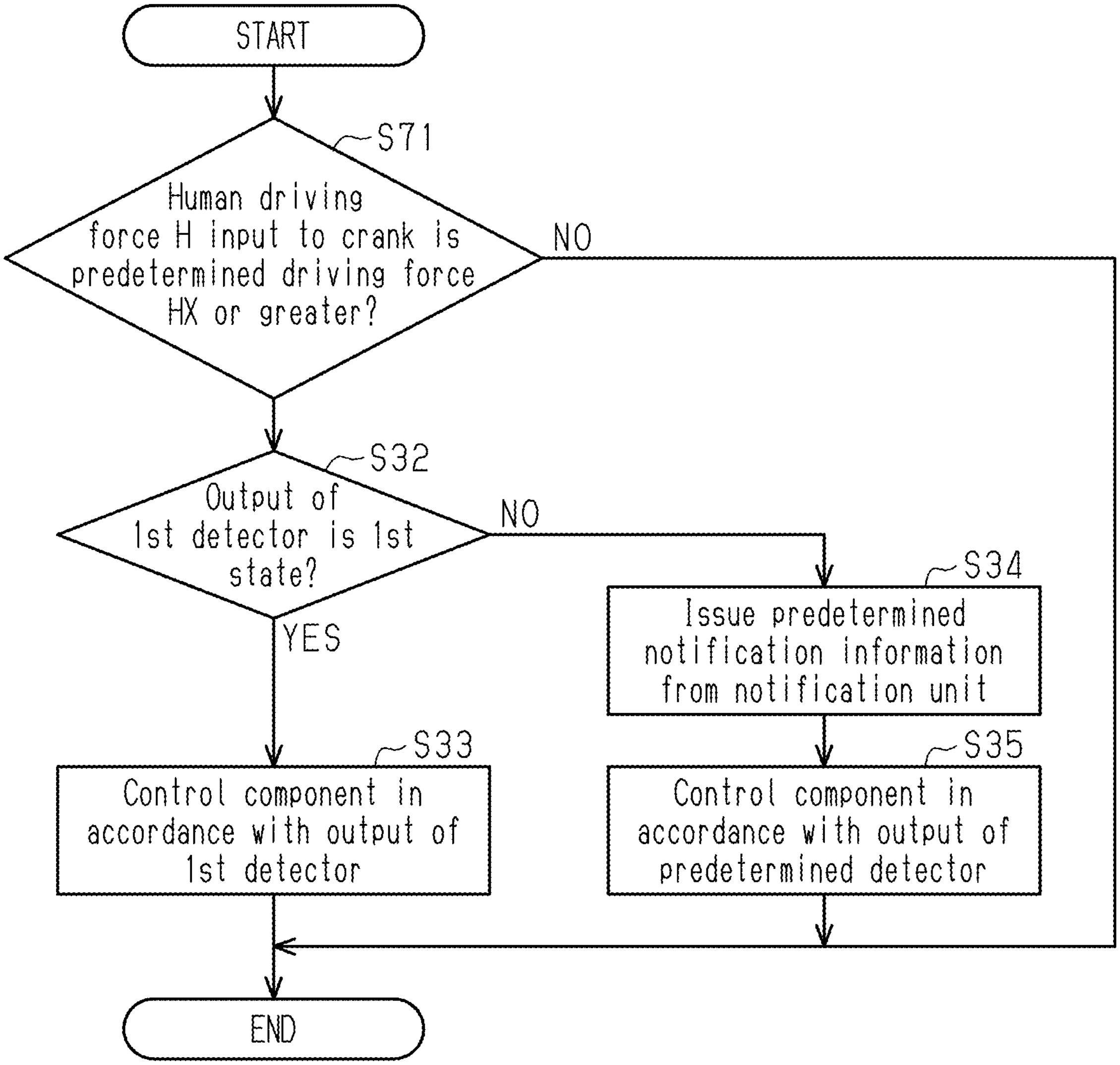
FIG. 14 is a flowchart illustrating a process executed by an electronic controller in accordance with a modification of the second embodiment to control a vehicle component.

In a case where the human driving force H input to the crank 12 is greater than the predetermined driving force HX and the output of the first detector 48 is in the first state, the controller 72 can be configured to control the vehicle component 38 in accordance with the output of the first detector 48. Further, in a case where the human driving force H input to the crank 12 is greater than the predetermined driving force HX and the output of the first detector 48 is not in the first state, the controller 72 can be configured to control the vehicle component 38 in accordance with an output of a predetermined detector that differs from the first detector 48 among the detectors 46. For example, step S71 of FIG. 14 is added to the process shown in FIG. 5. In the flowchart shown in FIG. 14, in a case where electric power is supplied to the controller 72, the controller 72 starts the process from step S71. In a case where the process of the flowchart shown in FIG. 14 ends, the controller 72 repeats the process from step S71 in predetermined cycles until the supply of electric power stops. In step S71, the controller 72 determines whether the human driving force H input to the crank 12 is greater than or equal to the predetermined driving force HX. In a case where the human driving force H input to the crank 12 is greater than or equal to the predetermined driving force HX, the controller 72 proceeds to step S32. In a case where the human driving force H input to the crank 12 is not greater than or equal to the predetermined driving force HX, the controller 72 ends the process.

Figure 15:
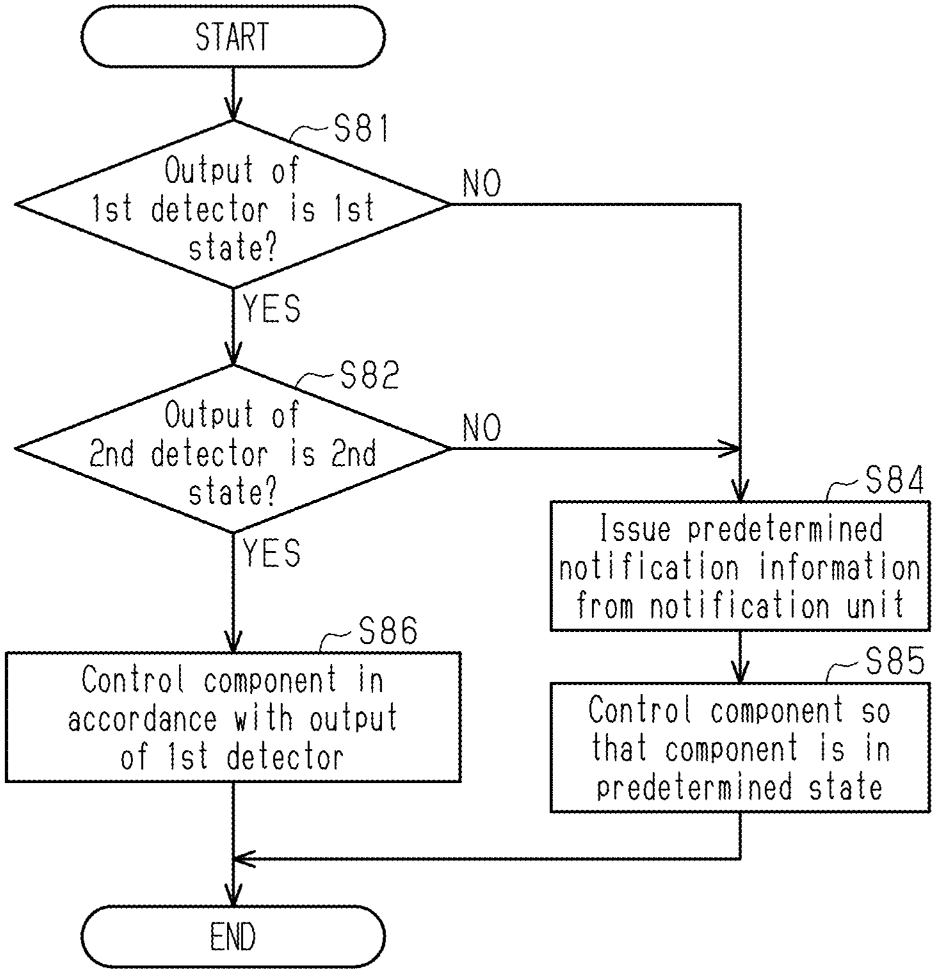
FIG. 15 is a flowchart illustrating a process executed by an electronic controller in accordance with a modification of the fourth embodiment to control a vehicle component.

In the fourth embodiment and its modifications, the controller 72 can control the vehicle component 38 in accordance with at least one of the third information and the fourth information in a case where the output of the first detector 48 is in the first state and the output of the second detector 50 is in the second state. For example, the controller 72 executes the process of the flowchart shown in FIG. 15 instead of the process of the flowchart shown in FIG. 8. In the flowchart shown in FIG. 15, step S83 in the flowchart shown in FIG. 8 is changed to step S86. In step S82, in a case where the output of the first detector 48 is in the second state, the controller 72 proceeds to step S86. In step S86, the controller 72 controls the vehicle component 38 in accordance with the output of the first detector 48 and then ends the process. In this modification, the second detector 50 does not have to be used for controlling the vehicle component 38.

Figure 16:
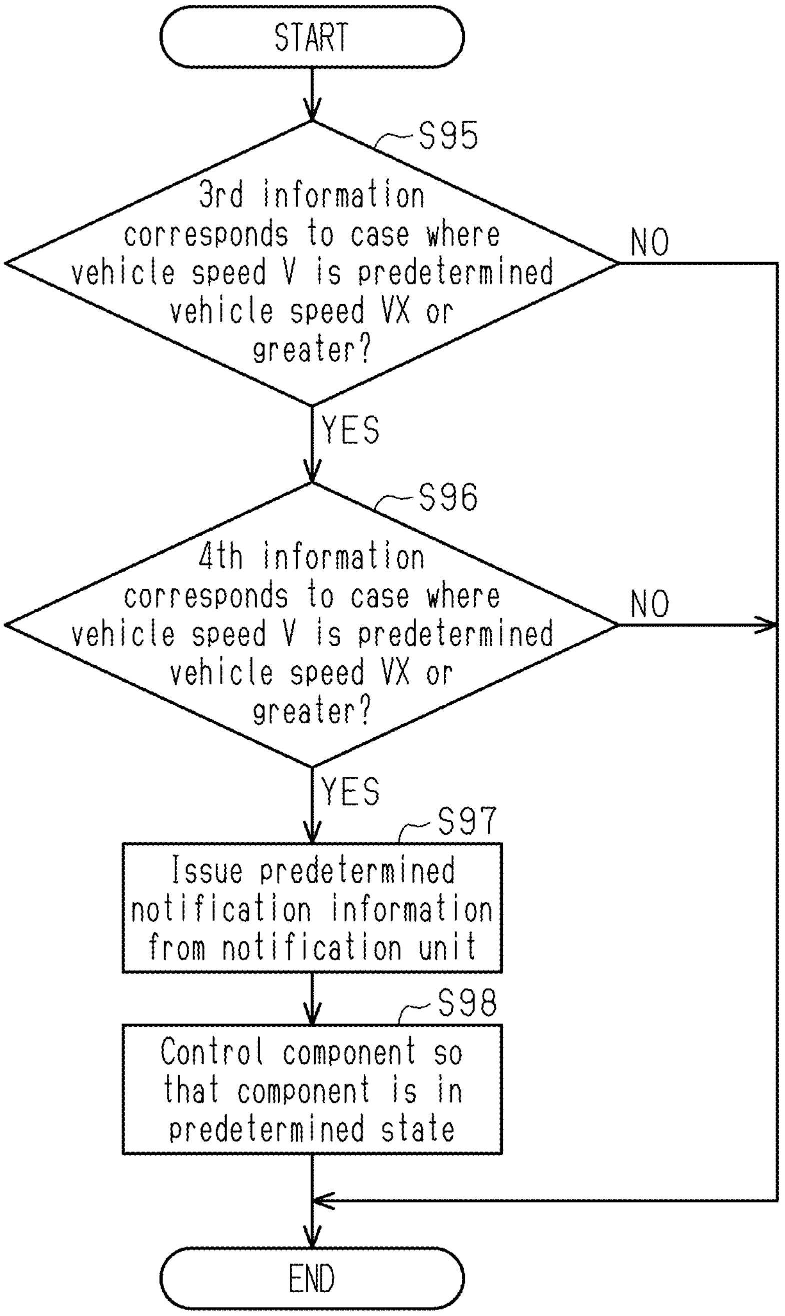
FIG. 16 is a flowchart illustrating a process executed by an electronic controller in accordance with a modification of the fifth embodiment to control a vehicle component.

In the fifth embodiment and its modifications, the controller 72 can control the vehicle component 38 so that the vehicle component 38 is in the predetermined state in a case where both of the third information and the fourth information correspond to the case where the vehicle speed V of the human-powered vehicle 10 is greater than or equal to the predetermined vehicle speed VX. For example, the controller 72 executes the process of the flowchart shown in FIG. 16 instead of the process of the flowchart shown in FIG. 9. A process for controlling the vehicle component 38 in accordance with the state of the outputs of the detectors 46 will now be described with reference to FIG. 16. In a case where electric power is supplied to the controller 72, the controller 72 starts the process from S95 of the flowchart shown in FIG. 16. In a case where the process of the flowchart shown in FIG. 16 ends, the controller 72 repeats the process from step S95 in predetermined cycles until the supply of electric power stops. In step S95, the controller 72 determines whether the third information corresponds to the case where the vehicle speed V is greater than or equal to the predetermined vehicle speed VX. In a case where the third information does not correspond to the case where the vehicle speed V is greater than or equal to the predetermined vehicle speed VX, the controller 72 ends the process. In a case where the third information corresponds to the case where the vehicle speed V is greater than or equal to the predetermined vehicle speed VX, the controller 72 proceeds to step S96. In step S96, the controller 72 determines whether the fourth information corresponds to the case where the vehicle speed V is greater than or equal to the predetermined vehicle speed VX. In a case where the fourth information does not correspond to the case where the vehicle speed V is greater than or equal to the predetermined vehicle speed VX, the controller 72 ends the process. In a case where the fourth information corresponds to the case where the vehicle speed V is greater than or equal to the predetermined vehicle speed VX, the controller 72 proceeds to step S97. In step S97, the controller 72 issues the predetermined notification information from the notification unit 42 and then proceeds to step S98. In step S98, the controller 72 controls the vehicle component 38 so that the vehicle component 38 is in the predetermined state and then ends the process.

The fourth embodiment and its modifications can be combined with the fifth embodiment or the modifications of the fifth embodiment. For example, the controller 72 can execute the process of the flowchart shown in FIG. 8 or 15 independently from the process of the flowchart shown in FIG. 9 or 16. For example, in step S83 of the flowchart shown in FIG. 8, the controller 72 can execute the process of the flowchart shown in FIG. 9 or 16. For example, in a case where the controller 72 controls the vehicle component 38 so that the controller 72 is in the predetermined state in the process of the flowchart shown in FIG. 8 or 15, the controller 72 controls the vehicle component 38 so that the vehicle component 38 is in the predetermined state irrelevant of the process of the flowchart shown in FIG. 9 or 16. For example, in a case where the controller 72 controls the vehicle component 38 so that the vehicle component 38 is in the predetermined state in the process of the flowchart shown in FIG. 9 or 16, the controller 72 controls the vehicle component 38 so that the vehicle component 38 is in the predetermined state irrelevant of the process of the flowchart shown in FIG. 8 or 15.

Figure 10:
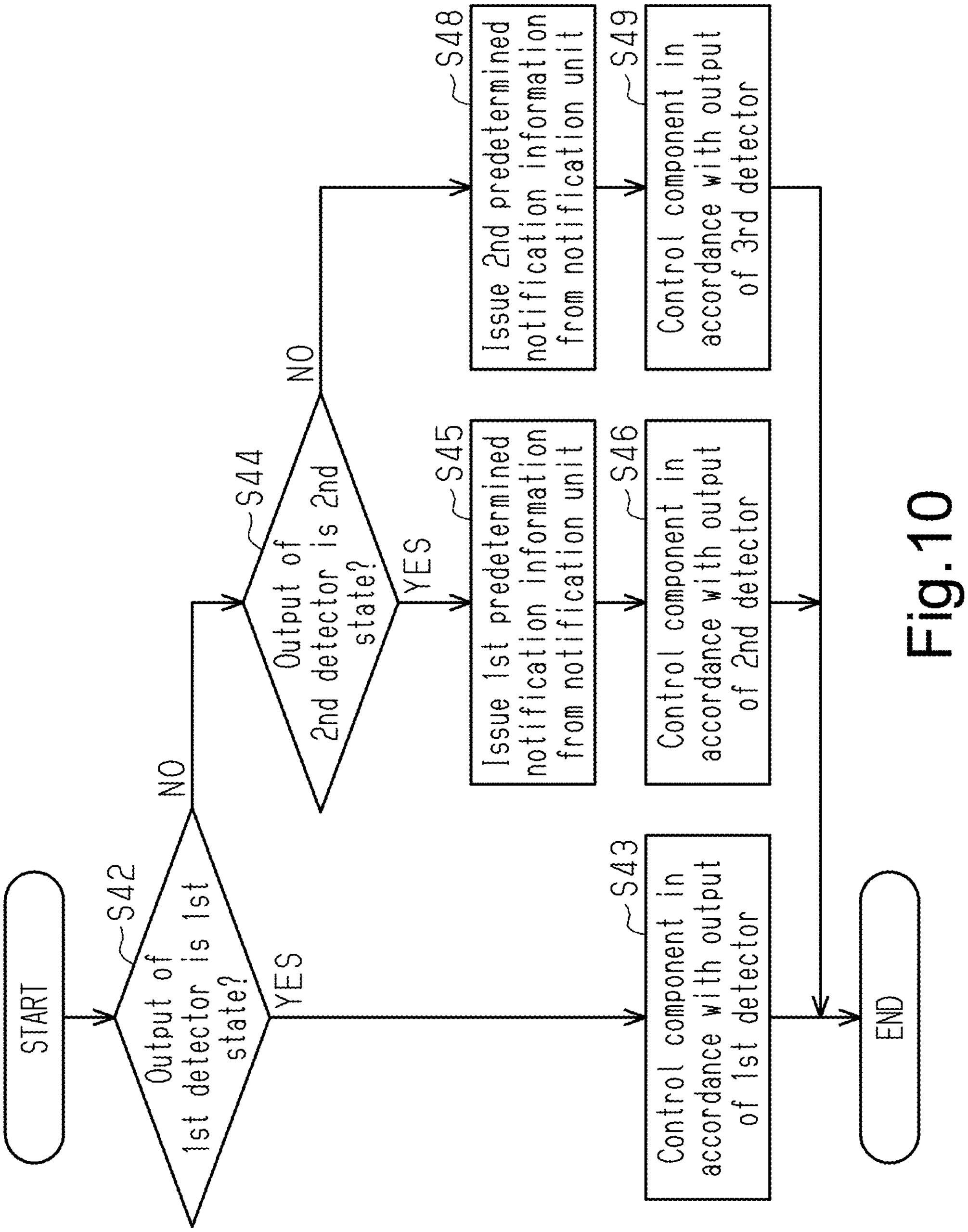
FIG. 10 is a flowchart illustrating a process executed by an electronic controller in accordance with a first modification of the third embodiment to control a vehicle component.

In the fourth and fifth embodiments and the modifications of the first, second, third, fourth, and fifth embodiments, the notification unit 42 can be omitted. In the modifications, for example, steps S18 and S23 of FIG. 4, step S34 of FIG. 5, steps S45, S48, and S50 of FIG. 7, step S84 of FIG. 8, step S93 of FIG. 9, steps S45 and S48 of FIG. 10, steps S45 and S48 of FIG. 11, steps S45, S48, and S50 of FIG. 12, steps S63, S66, and S68 of FIG. 13, step S34 of FIG. 14, step S84 of FIG. 15, and step S97 of FIG. 16 can be omitted.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for a bicycle that includes a vehicle component and a plurality of detectors, the plurality of detectors includes a first detector configured to detect first information related to the bicycle and a second detector configured to detect second information related to the bicycle, and the first information is correlated with the second information, the control device comprising:

an electronic controller configured to control the vehicle component in accordance with at least one of an output of the first detector and an output of the second detector upon determining the output of the first detector is in a first state and the output of the second detector is in a second state, the electronic controller being configured to control the vehicle component in accordance with the output of the second detector without using the output of the first detector upon determining the output of the first detector is not in the first state and the output of the second detector is in the second state, and the electronic controller being configured to control the vehicle component in accordance with the output of the first detector without using the output of the second detector upon determining the output of the first detector is in the first state and the output of the second detector is not in the second state.

2. The control device according to claim 1, wherein the electronic controller is configured to control the vehicle component in accordance with at least one of a first parameter related to the first information and a second parameter related to the second information.

3. The control device according to claim 2, wherein the electronic controller is configured to estimate the first parameter in accordance with the second parameter calculated from the second information upon determining the output of the first detector is not in the first state and the output of the second detector is in the second state and control the vehicle component in accordance with the estimated first parameter.

4. The control device according to claim 2, wherein the electronic controller is configured to estimate the second parameter in accordance with the first parameter calculated from the first information upon determining the output of the first detector is in the first state and the output of the second detector is not in the second state and control the vehicle component in accordance with the estimated second parameter.

5. The control device according to claim 1, wherein a signal output from the second detector includes a second predetermined signal in a case where the output of the second detector is not in the second state.

6. The control device according to claim 1, wherein a signal output from the first detector includes a first predetermined signal in a case where the output of the first detector is not in the first state.

7. The control device according to claim 1, wherein the first signal includes a signal generated in at least one of cases where the first detector is defective, a connection between the first detector and the electronic controller is anomalous, the first detector differs from a predetermined configuration, and the connection between the first detector and the electronic controller differs from a predetermined configuration.

8. The control device according to claim 1, wherein a signal is not output from the first detector in a case where the output of the first detector is not in the first state.

9. The control device according to claim 1, wherein the electronic controller issues predetermined notification information from a notification unit in a case where the output of the first detector is not in the first state.

10. The control device according to claim 1, wherein the vehicle component includes a motor configured to apply a propulsion force to the bicycle.

11. The control device according to claim 10, wherein the plurality of detectors includes at least one of a vehicle speed sensor configured to detect information corresponding to a rotational speed of a wheel of the bicycle, a crank rotation sensor configured to detect information corresponding to a rotational speed of a crank of the bicycle, an acceleration sensor configured to detect information corresponding to acceleration of the bicycle, a position information detection sensor configured to detect information corresponding to a position of the bicycle, and a motor rotation sensor configured to detect information corresponding to a rotational speed of a motor applying a propulsion force to the bicycle.

12. The control device according to claim 1, wherein the electronic controller is configured to determine that the first detector is not in the first state when a signal output from the first detector is anomalous due to at least one of: the first detector being defective, a connection between the first detector and the electronic controller being anomalous, the first detector differing from a predetermined configuration, and the connection between the first detector and the electronic controller differing from a predetermined configuration.

13. The control device according to claim 1, wherein the electronic controller is configured to determine that the second detector is not in the second state when a signal output from the second detector is anomalous due to at least one of: the second detector being defective, a connection between the second detector and the electronic controller being anomalous, the second detector differing from a predetermined configuration, and the connection between the second detector and the electronic controller differing from a predetermined configuration.

14. The control device according to claim 1, wherein the electronic controller is configured to determine that the first detector is not in the first state when the first detector does not output a signal.

15. The control device according to claim 1, wherein the electronic controller is configured to determine that the second detector is not in the second state when the second detector does not output a signal.

* * * * *